US012585667B2

(12) United States Patent　　　　　(10) Patent No.:　US 12,585,667 B2

Bharadwaj　　　　　　　　　　　　　(45) Date of Patent:　　Mar. 24, 2026

(54) PROVIDING INFORMATION ASSOCIATED WITH A CONTENT BASED ON CONTEXT

(71) Applicant: Srinivas Bharadwaj, Los Altos, CA (US)

(72) Inventor: Srinivas Bharadwaj, Los Altos, CA (US)

( * ) Notice: Subject to any disclaimer, the term of this patent is extended or adjusted under 35 U.S.C. 154(b) by 349 days.

(21) Appl. No.: 17/565,090

(22) Filed: Dec. 29, 2021

(65) Prior Publication Data

US 2023/0205781 A1　　Jun. 29, 2023

(51) Int. Cl.
| | |
|---|---|
| *G06F 16/23* | (2019.01) |
| *G06F 16/242* | (2019.01) |
| *G06F 16/25* | (2019.01) |
| *G06F 16/26* | (2019.01) |

(52) U.S. Cl.
CPC .......... *G06F 16/26* (2019.01); *G06F 16/2379* (2019.01); *G06F 16/2425* (2019.01); *G06F 16/25* (2019.01)

(58) Field of Classification Search
None
See application file for complete search history.

(56) References Cited

U.S. PATENT DOCUMENTS

| | | | | |
|---|---|---|---|---|
| 2011/0261030 A1* | 10/2011 | Bullock | ............... | G06F 3/0488 |
| | | | | 345/204 |
| 2014/0337730 A1* | 11/2014 | King | .................... | G06F 3/0481 |
| | | | | 715/781 |

OTHER PUBLICATIONS

Lampropoulos, Georgios, et al., "Enhancing the functionality of augmented reality using deep learning, semantic web and knowledge graphs: A review", Elsevier, Visual Informatics 4 (Jan. 2020), pp. 32-42. (Year: 2020).*
Scavarelli, Anthony, et al., "Virtual reality and augmented reality in social learning spaces: a literature review", Mar. 2021, Springer Nature, Virtual Reality 25, pp. 257-277. (Year: 2021).*

* cited by examiner

*Primary Examiner* — Scott A. Waldron

(57)　　　　　　　ABSTRACT

Present disclosure provides a method and an electronic device (100) for providing information associated with content. The method includes receiving, by the electronic device (100), a query with respect to the content provided in an electronic document displayed by the electronic device (100) and tagging, by the electronic device (100), the received query with at least one context of a plurality of contexts. Further, the method includes determining, by the electronic device (100), information associated to the received query based on the context of the query; generating, by the electronic device (100), a knowledge graph comprising the determined information, and providing, by the electronic device (100), the knowledge graph to the received query as a collaborative virtual transparent overlay (CVTO). The knowledge graph comprises information associated with a specific context from plurality of information sources.

39 Claims, 13 Drawing Sheets

FIG. 2A

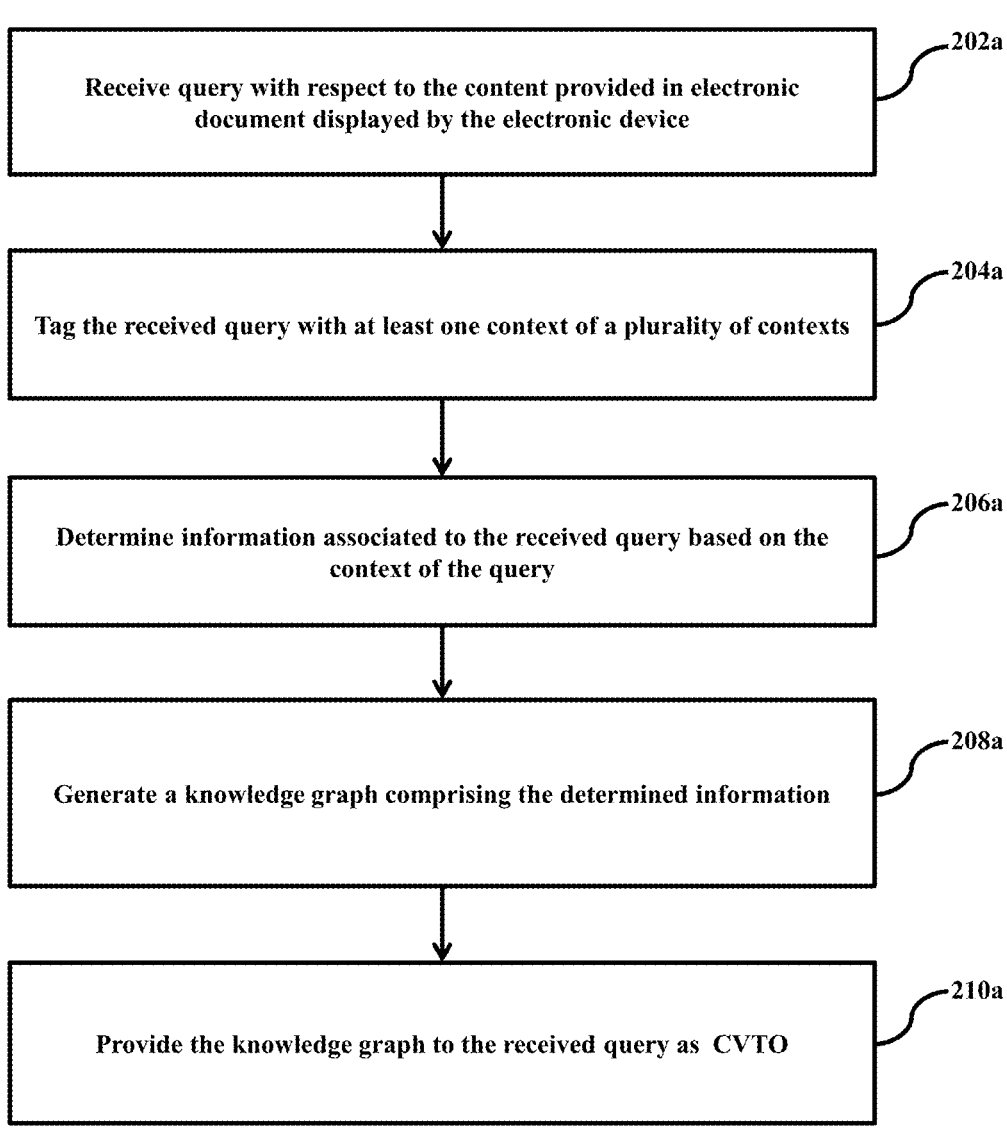

Receive query with respect to the content provided in electronic document displayed by the electronic device — 202a Tag the received query with at least one context of a plurality of contexts — 204a Determine information associated to the received query based on the context of the query — 206a Generate a knowledge graph comprising the determined information — 208a Provide the knowledge graph to the received query as CVTO — 210a

FIG. 2B

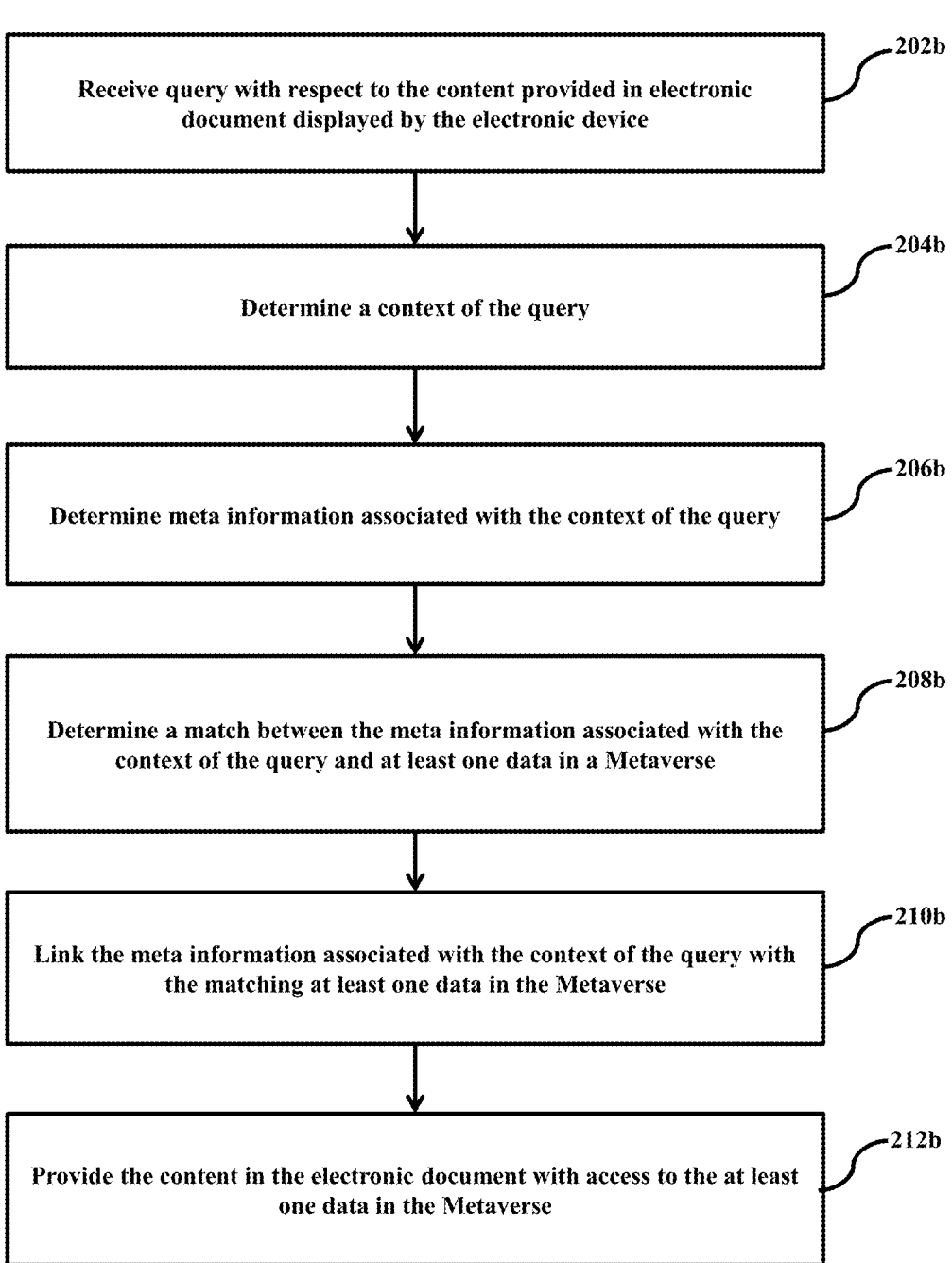

202b — Receive query with respect to the content provided in electronic document displayed by the electronic device 204b — Determine a context of the query 206b — Determine meta information associated with the context of the query 208b — Determine a match between the meta information associated with the context of the query and at least one data in a Metaverse 210b — Link the meta information associated with the context of the query with the matching at least one data in the Metaverse 212b — Provide the content in the electronic document with access to the at least one data in the Metaverse

FIG. 5

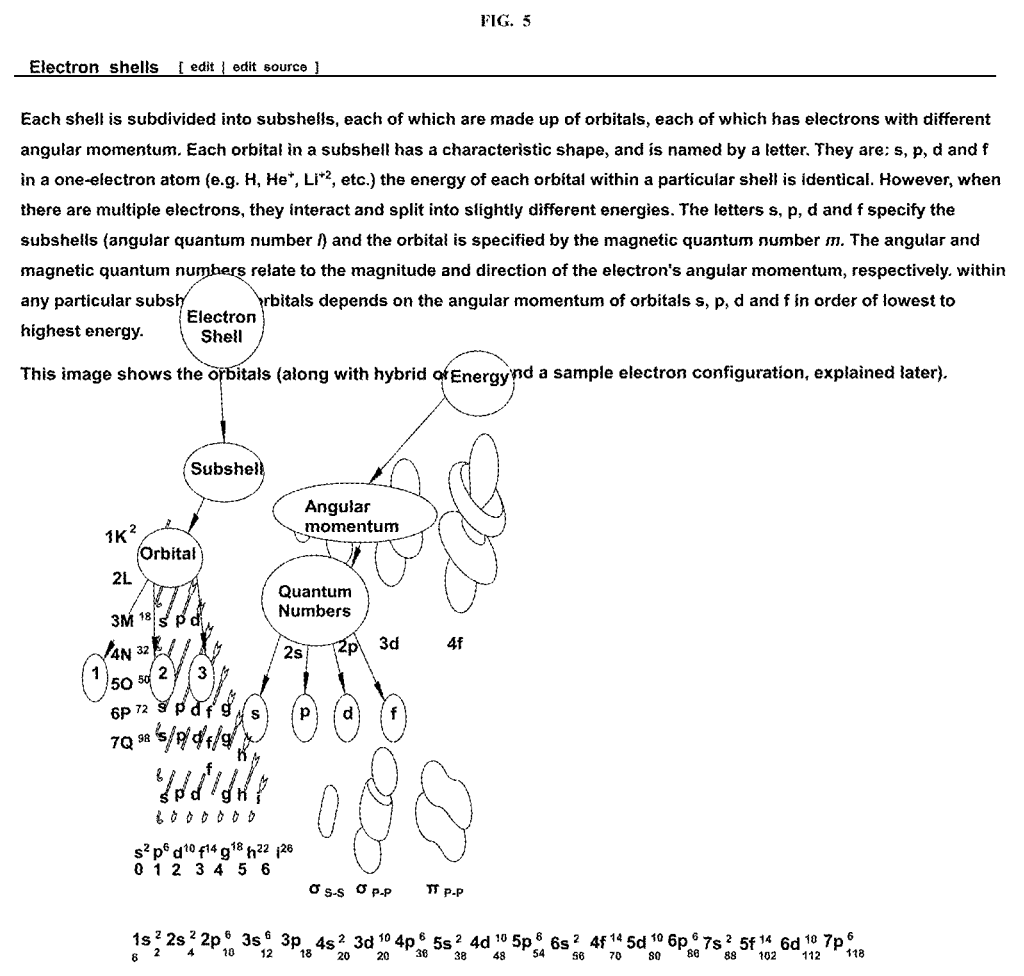

Electron shells    [ edit | edit source ]

Each shell is subdivided into subshells, each of which are made up of orbitals, each of which has electrons with different angular momentum. Each orbital in a subshell has a characteristic shape, and is named by a letter. They are: s, p, d and f in a one-electron atom (e.g. H, He$^+$, Li$^{+2}$, etc.) the energy of each orbital within a particular shell is identical. However, when there are multiple electrons, they interact and split into slightly different energies. The letters s, p, d and f specify the subshells (angular quantum number $l$) and the orbital is specified by the magnetic quantum number $m$. The angular and magnetic quantum numbers relate to the magnitude and direction of the electron's angular momentum, respectively. within any particular subshell orbitals depends on the angular momentum of orbitals s, p, d and f in order of lowest to highest energy.

This image shows the orbitals (along with hybrid orbitals and a sample electron configuration, explained later).

$s^2 p^6 d^{10} f^{14} g^{18} h^{22} i^{26}$
0  1  2  3  4  5  6

$\sigma_{s\text{-}s}$   $\sigma_{p\text{-}p}$   $\pi_{p\text{-}p}$ $1s^2 2s^2 2p^6 3s^6 3p^6 4s^2 3d^{10} 4p^6 5s^2 4d^{10} 5p^6 6s^2 4f^{14} 5d^{10} 6p^6 7s^2 5f^{14} 6d^{10} 7p^6$

Electronic device 100

Wheatstone bridge

A Wheatstone bridge is an electrical circuit used to measure an unknown electrical resistance by balancing two legs of a bridge circuit, one leg of which includes the unknown component... (in contrast with something like a simple voltage divider).[1] Its operation is similar to the original potentiometer.

PROVIDING INFORMATION ASSOCIATED WITH A CONTENT BASED ON CONTEXT

TECHNICAL FIELD

The embodiments herein generally relates to presenting information. More particularly related to a method and electronic device for providing information associated with content using either a knowledge graph or a metaverse.

BACKGROUND

Generally, to gain help from context-oriented content and resources is a critical need faced by many learners and content consumers. Content today takes varied forms, like books, pdfs, web pages, slides, videos and other resources widely available on the ever growing internet. With Covid19 spreading across societies and social distancing being the norm to tackle the Covid19 exposed divide that exists between simple primitive tools and technologies like Augmented Reality and Artificial Intelligence and the learning needs of ordinary students, consumer learners and corporate professionals as they study ever more complex textbooks, manuals and professional training material. The chasm between such tools and their use to solve the difficulties today's learners face is a key part of the difficulty that prevents ease of learning and is more so when younger students are forced to learn more difficult conceptual topics.

The main issues that prevent it are a lack of integrated learning in today's technology and content. Books and lectures are the traditional ways by which students learn. Yet books are a medium that has evolved and grown in parallel but separate from video and other forms of content. While teachers, who create their own pages, do sometimes present the two on the same page, they do not do so in ways that allow for cross channel integration.

Context oriented Content is one way to bridge this chasm. Traditional books have been on paper. New media streams, including eBook, have taken these and published them as eBooks. Some also are available as audiobooks. Yet, a reader of books often struggles with them notably when they involve complex ideas or are tedious and involved. The additions of auxiliary and secondary audiovisual content and channels that exist and are available in context is a new way of integrating previously unlinked sources like books, videos, slides and quizzes and this form of integrated learning content is particularly critical to the future evolution of both eBooks and Audio-Visual Content. Virtual Transparent Overlays (VTO) offers a way for us to grow this. Further as remote work grows the ability to build collaborative relationships and perform close collaborative work is becoming increasingly important. The VTOs can be a mechanism for creating, building and growing collaborative relationships across disparate organizations and more generally on the internet, and allow new customer-client relationships, team relationships and exploration interaction. However, the VTOs needs to be intelligently generated placed and updated for the VTOs to be effective in the long run.

Thus, it is desired to address the above mentioned disadvantages or other shortcomings or at least provide a useful alternative.

SUMMARY

The present disclosure provides a method for providing information associated with content in an electronic device. The method includes receiving, by the electronic device, a query with respect to the content provided in an electronic document displayed by the electronic device and determining, by the electronic device, information associated to the received query based on the context of the query. The content is a static text and tagging, by the electronic device, the received query with at least one context of a plurality of contexts. The method includes generating, by the electronic device, a knowledge graph comprising the determined information, wherein the knowledge graph comprises information associated with a specific context from plurality of information sources; and providing, by the electronic device, the knowledge graph to the received query as a collaborative virtual transparent overlay (CVTO).

In an embodiment, generating, by the electronic device, the knowledge graph comprising the determined information includes performing, by the electronic device, a generic search using the received query on a database and obtaining, by the electronic device, a first set of information based on the generic search. The method includes sending, by the electronic device, the received query to at least one another electronic device which is online and obtaining, by the electronic device, a second set of information associated with the query based on responses from the at least one another electronic device which is online. Further, the method includes determining by the electronic device, a similar query raised by at least one another electronic device based on the context of the query and obtaining, by the electronic device, a third set of information associated based on responses to similar query. Then the method includes determining, by the electronic device, at least one node of a plurality of nodes of the knowledge graph based on the context of the query for linking each of the first set of information, the second set of information and the third set of information; and generating, by the electronic device, the knowledge graph by linking each of the first set of information, the second set of information and the third set of information to the determined at least one node.

In an embodiment, the first set of information is provided as a first knowledge graph, the second set of information is provided as a second knowledge graph and the third set of information is provided as a third knowledge graph linked to form the knowledge graph.

In an embodiment, the at least one node of a plurality of nodes of the knowledge graph for linking each of the first set of information, the second set of information and the third set of information is manually provided to the electronic device.

In an embodiment, providing, by the electronic device, the knowledge graph to the received query as the CVTO includes determining, by the electronic device, a hierarchy for arrangement based on at least one of a user preference of information hierarchy, a source of the information, a mode of presentation of the information, a rating of the source of the information associated with the knowledge graph. The method also includes arranging, by the electronic device, the plurality of nodes of the knowledge graph based on the hierarchy for arrangement; and providing, by the electronic device, the knowledge graph to the received query as the CVTO.

In an embodiment, the at least one context of the plurality of contexts comprises at least one page in an eBook, a line of content in a syllabus and at least one node of the plurality of nodes in the Knowledge Graph.

In an embodiment, the method also includes determining, by the electronic device, information associated to a plurality of queries similar to the received query over a period of time. Further, the method includes performing, by the electronic device, iterative improvement of the knowledge graph of the received query using Reinforcement Learning and updating, by the electronic device, the CVTO of the knowledge graph based on the iterative improvement of the knowledge graph.

In an embodiment, the method further includes creating, by the electronic device, a table comprising the plurality of queries and at least one CVTO of the knowledge graph associated with the context and storing, by the electronic device, the table comprising the plurality of queries and the CVTO of the knowledge graph associated with the context. The plurality of queries is added into a distributed Queue against a topic based on the context. Further, the method includes receiving, by the electronic device, a similar query provided by a user; determining, by the electronic device, at least one the CVTO of the knowledge graph associated with the context of the similar query from the stored table; and providing, by the electronic device, the determined at least one the CVTO of the knowledge graph associated with the context of the similar query.

In an embodiment, the CVTO of the knowledge graph comprises multiple layers of information and is structured to expand based on user selection.

In an embodiment, each of the multiple layers of information is associated with a specific source of information.

In an embodiment, the CVTO of the knowledge graph is implemented in one of an augmented reality (AR) environment with the multiple layers of information augmented to the knowledge graph and a virtual reality (VR) environment.

In an embodiment, the method further includes providing, by the electronic device, a plurality of questions to the user based on the access of the CVTO of the knowledge graph by the user periodically and determining, by the electronic device, a level of understanding of the user based on response to the plurality of questions. The method also includes updating, by the electronic device, the level of understanding of the user on an evolving tree periodically, modifying, by the electronic device, the information in the knowledge graph based on the evolving tree; and updating, by the electronic device, the CVTO of the knowledge graph based on the modification of the knowledge graph. The evolving tree comprises a plurality of levels of understanding associated with a number of correct responses to the plurality of questions.

In an embodiment, the method further includes providing, by the electronic device, an inquiry widget to determine an interest of a user in posing the query; and receiving, by the electronic device, a user response to the inquiry widget. The method also includes modifying, by the electronic device, the information in the knowledge graph based on the user response to the inquiry widget and updating, by the electronic device, the CVTO of the knowledge graph based on the modification of the knowledge graph.

In an embodiment, the method further includes obtaining, by the electronic device, a new set of information associated with a new context, wherein the new context is linked to the context of the query; and providing, by the electronic device, an optional CVTO comprising the new set of information based on one of user preference, the evolving tree.

In an embodiment, the electronic document is displayed remotely by a server and the CVTO is provided locally on the electronic device.

In an embodiment, the knowledge graph comprises a plurality of sub-graphs comprising additional information associated with the context of the query and is displayed based on one of user preference and the evolving tree.

In an embodiment, the method further includes determining, by the electronic device, access of a specific set of CVTOs of specific knowledge graphs associated with the context by multiple users; and automatically linking, by the electronic device, each of the specific set of CVTOs of specific knowledge graphs associated with the context.

In an embodiment, the method further includes embedding, by the electronic device, the knowledge graph with the received query and the generated CVTO at a specific location of the content in the electronic document, wherein the knowledge graph and the generated CVTO is continuously updated based on reinforcement learning.

In an embodiment, the method further includes determining, by the electronic device, a content present in the electronic document in the electronic device and an existing learning management system (LMS). Further, the method also includes determining, by the electronic device, the context associated with the content; and linking, by the electronic device, the content present in the electronic document and the existing LMS to the knowledge graph based on the context.

In an embodiment, the method further includes determining, by the electronic device, a level of understanding of the user and sharing, by the electronic device, the level of understanding of the user with another electronic device. The method also includes receiving, by the electronic device, additional data from the another electronic device to enhance the level of understanding of the user, wherein the another electronic device is a tutor device and updating, by the electronic device, the information in the knowledge graph based on the received additional data; and updating, by the electronic device, the CVTO of the knowledge graph based on the modification of the knowledge graph.

Accordingly the embodiments herein provide a method for providing information associated with content in an electronic device. The method includes receiving, by the electronic device, a query with respect to the content provided in an electronic document displayed by the electronic device, wherein the content is a static text and determining, by the electronic device, a context of the query. The method also includes determining, by the electronic device, meta information associated with the context of the query and determining, by the electronic device, a match between the meta information associated with the context of the query and at least one data in a Metaverse, wherein the matching at least one data comprises information associated with the query. Further, the method includes linking, by the electronic device, the Meta information associated with the context of the query with the matching at least one data and/or one context that is present inside the Metaverse (a virtual universe); and providing, by the electronic device, the content in the electronic document with access to the at least one data in the Metaverse; the method also facilitates access to the electronic document when the user enters the metaverse along with the additional VTOs and CVTOs. In one embodiment, this is done by facilitating a "Remote Display" of the VTO enhanced reader inside the Metaverse.

Accordingly the embodiments herein provide an electronic device for providing information associated with content. The electronic device includes a memory, a processor, a communicator and a content management controller. The is content management controller configured to receive a query with respect to the content provided in an electronic document displayed by the electronic device, tag the received query with at least one context of a plurality of contexts and determine information associated to the received query based on the context of the query. The content is a static text. Further, the content management controller is configured to generate a knowledge graph comprising the determined information and provide the knowledge graph to the received query as a collaborative virtual transparent overlay (CVTO). The knowledge graph comprises information associated with a specific context from plurality of information sources.

Accordingly the embodiments herein provide an electronic device for providing information associated with content. The electronic device includes a memory, a processor, a communicator and a content management controller. The content management controller is configured to receive a query with respect to the content provided in an electronic document displayed by the electronic device, determine a context of the query and determine meta information associated with the context of the query. Further, the content management controller is configured to determine a match between the meta information associated with the context of the query and at least one data element in a Metaverse; link the meta information associated with the context of the query with matching at least one data element in the Metaverse and provide the content in the electronic document with access to the at least one data in the Metaverse, and facilitating entry of the user into a specific context sensitive virtual location in the Metaverse. The matching at least one data comprises information associated with the query.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which:

FIG. 2A is a flow chart for a method for providing information associated with the content in the electronic device using the CVTO, according to the embodiments as disclosed herein;

FIG. 2B is a flow chart for a method for providing information associated with the content in the electronic device using the Metaverse, according to the embodiments as disclosed herein;

FIG. 5 is an example illustrating a knowledge graph provided as the CVTO in the eBook, according to the embodiments as disclosed herein;

DETAILED DESCRIPTION OF EMBODIMENT

Figure 1A:
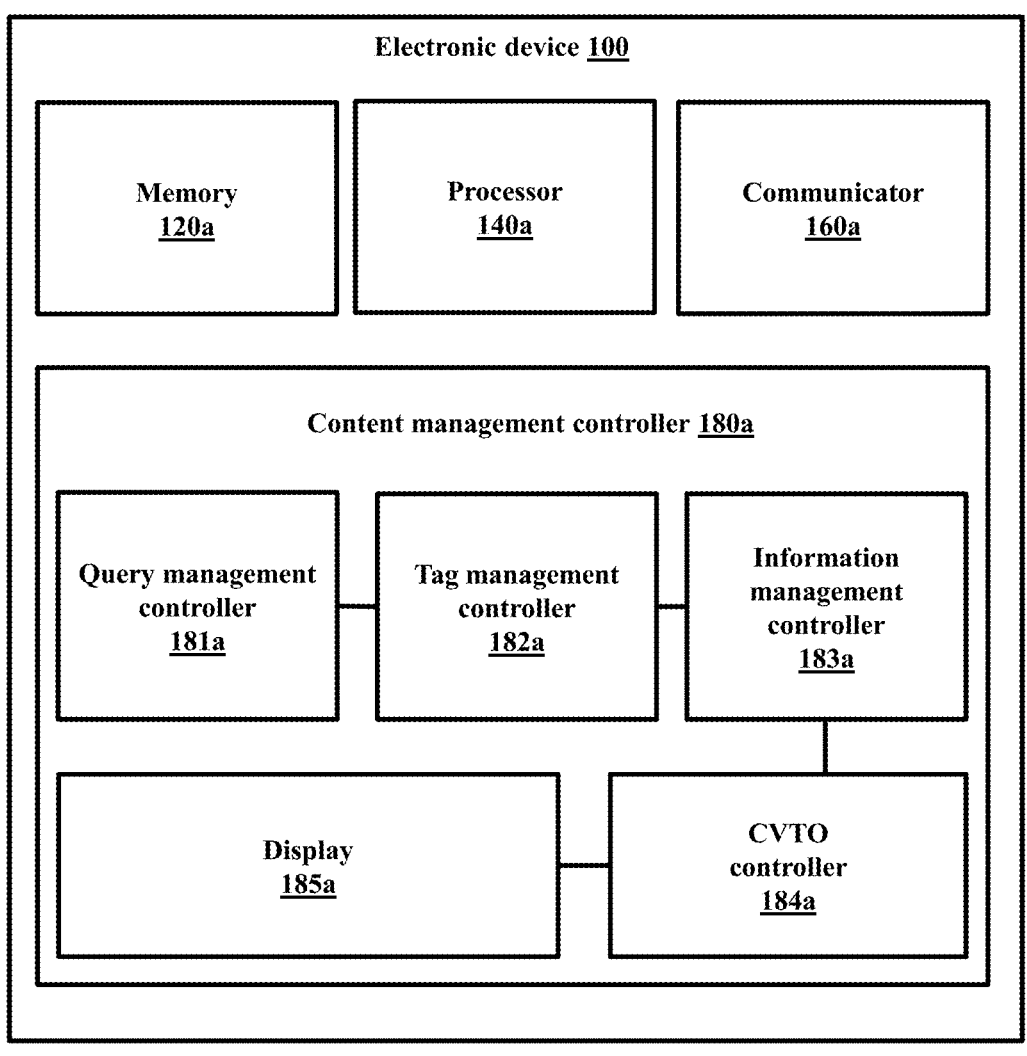
FIG. 1A is a block diagram illustrating an electronic device for providing information associated with a content in an electronic device using a CVTO, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Prior to describing the present embodiment detail, it is useful to provide definitions for key terms and concepts used herein. Unless defined otherwise, all technical and scientific terms used herein have the same meaning as commonly understood by one of ordinary skill in the art.

The present disclosure provides a method for providing information associated with content in an electronic device. The method includes receiving, by the electronic device, a query with respect to the content provided in an electronic document displayed by the electronic device and determining, by the electronic device, information associated to the received query based on the context of the query. The content is a static text and tagging, by the electronic device, the received query with at least one context of a plurality of contexts. The method includes generating, by the electronic device, a knowledge graph comprising the determined information, wherein the knowledge graph comprises information associated with a specific context from plurality of information sources; and providing, by the electronic device, the knowledge graph to the received query as a collaborative virtual transparent overlay (CVTO).

Accordingly the embodiments herein provide a method for providing information associated with content in an electronic device. The method includes receiving, by the electronic device, a query with respect to the content provided in an electronic document displayed by the electronic device, wherein the content is a static text and determining, by the electronic device, a context of the query. The method also includes determining, by the electronic device, meta information associated with the context of the query and determining, by the electronic device, a match between the meta information associated with the context of the query and at least one data in a Metaverse, wherein the matching at least one data comprises information associated with the query. Further, the method includes linking, by the electronic device, the Meta information associated with the context of the query with the matching at least one data in the Metaverse; and providing, by the electronic device, the content in the electronic document with access to the at least one data in the Metaverse.

Accordingly the embodiments herein provide an electronic device for providing information associated with content. The electronic device includes a memory, a processor, a communicator and a content management controller. The is content management controller configured to receive a query with respect to the content provided in an electronic document displayed by the electronic device, tag the received query with at least one context of a plurality of contexts and determine information associated to the received query based on the context of the query. The content is a static text. Further, the content management controller is configured to generate a knowledge graph comprising the determined information and provide the knowledge graph to the received query as a collaborative virtual transparent overlay (CVTO). The knowledge graph comprises information associated with a specific context from plurality of information sources.

Accordingly the embodiments herein provide an electronic device for providing information associated with content. The electronic device includes a memory, a processor, a communicator and a content management controller. The content management controller configured to receive a query with respect to the content provided in an electronic document displayed by the electronic device, determine a context of the query and determine meta information associated with the context of the query. Further, the content management controller configured to determine a match between the meta information associated with the context of the query and at least one data in a Metaverse; link the meta information associated with the context of the query with the matching at least one data in the Metaverse and provide the content in the electronic document with access to the at least one data in the Metaverse. The matching at least one data comprises information associated with the query. In one embodiment, the enhanced eBook Reader is available and accessible inside the Metaverse as a remote Display of the running application which is technically outside the Meta-Verse. The user can pan into this remote Display of the Application as he accessed it prior to entry (or from a prior context) and study from it even while being inside the Metaverse.

Unlike to the conventional methods and systems, in the proposed method the CVTOs are expanded to facilitate greater Knowledge transfer in collaborative environments. Further the Knowledge Graph is used as a second modality that expands or contracts the VTO framework that is part of the user's "Syllabus Discovery".

Conventional eBooks have not had portals into Meta-verse. Unlike to the conventional methods and systems, the proposed method uses Metaverse within the eBook which brings a whole new world of experience to readers of eBooks and a revolutionary trend.

In the conventional methods and systems, the knowledge graph is used to help drive search engines to provide "next search" based on search history keywords typed by a user and other similar users and also used by video streaming platforms to provide "next video list" based on Watch history. Unlike to the conventional methods and systems, in the proposed collaborative learning with the knowledge graph is a means of "indirect collaboration" as one user facilitates further learning through discovery. The user opens a "new pathway" based discovery. There are GNN or Graph Neural Networks and GCNs. Reinforcement learning can be used to grow the knowledge graph. Reinforcement Learning will aim to maximize a reward or group of rewards subject to criteria say for instance quiz results with less traversal or aim for quicker and fuller traversal based on the maximization goal that is set. The growth of the overlay and the weighting of precedence and other relationships are dynamic and aimed to expand achievable goals. The Knowledge Graph weights are enhanced and adapted to achieve the best structured traversal of a section of the knowledge graph.

Referring now to the drawings and more particularly to FIGS. 1A through 10, where similar reference characters denote corresponding features consistently throughout the figures, there are shown preferred embodiments.

FIG. 1A is a block diagram illustrating an electronic device (100) for providing information associated with a content in an electronic device (100) using a CVTO, according to the embodiments as disclosed herein.

Referring to the FIG. 1A, the electronic device (100) can be but not limited to, for example, a laptop, a palmtop, a desktop, a mobile phone, a smart phone, a television (TV), Personal Digital Assistant (PDA), a tablet, a wearable device, an Internet of Things (IoT) device, a virtual reality device, a foldable device, a flexible device and an immersive system. The electronic device (100) includes a memory (120a), a processor (140a), a communicator (160a) and a content management controller (180a).

The memory (120a) is configured to store a plurality of queries received and corresponding knowledge graphs generated by the electronic device (100). Further, the memory (120a) also stores instructions to be executed by the processor (140a). The memory (120a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120a) may, in some examples, be considered a non-transitory storage medium. The term "non-transitory" may indicate that the storage medium is not embodied in a carrier wave or a propagated signal. However, the term "non-transitory" should not be interpreted that the memory (120a) is non-movable. In some examples, the memory (120a) can be configured to store larger amounts of information. In certain examples, a non-transitory storage medium may store data that can, over time, change (e.g., in Random Access Memory (RAM) or cache).

The processor (140a) communicates with the memory (120a), the communicator (160a) and the content management controller (180a). The processor (140a) is configured to execute instructions stored in the memory (120a) and to perform various processes. The processor (140a) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160a) includes an electronic circuit specific to a standard that enables wired or wireless communication. The communicator (160) is configured to communicate internally between internal hardware components of the electronic device (100) and with external devices via one or more networks.

In an embodiment, the content management controller (180a) includes a query management controller (181a), a tag management controller (182a), an information management controller (183a), a CVTO controller (184a) and a display (185a).

In an embodiment, the query management controller (181a) is configured to receive a query with respect to the content provided in an electronic document displayed by the electronic device (100). The content is a static text. The query can be provided in the form of a text, voice, gestures, etc. The electronic document is displayed remotely by a server and the CVTO is provided locally on the electronic device (100). The query can be for example, "Explain components of nucleic acid" or "How is innovation different from invention?".

In an embodiment, the tag management controller (182a) is configured to tag the received query with at least one context of a plurality of contexts. The at least one context of the plurality of contexts includes at least one page in an eBook, a line of content in a syllabus and at least one node of the plurality of nodes in the Knowledge Graph. The context can be for example, an entire eBook related to Welfare economics or a syllabus related to Theory of relativity. In another example consider an eBook related to Bio-molecules, the context here can be a page in the eBook on Nucleic acids. Another example can be a line such as "Fresco on the ceiling of the Sistine Chapel by Michelangelo", etc.

In an embodiment, the information management controller (183a) is configured to determine information associated to the received query based on the context of the query. The information associated to the received query may include details such as the context, the related contexts, related tags, similar queries, number of users asking similar queries, etc.

In an embodiment, the CVTO controller (184a) is configured to generate the knowledge graph with the determined information includes perform a generic search using the received query on a database, obtain a first set of information based on the generic search. The first set of information can be obtained from for example, search on a public search engine/database such as Google®. Further, the CVTO controller (184a) is configured to send the received query to at least one another electronic device (100) which is online and obtain a second set of information associated with the query based on responses from the at least one another electronic device (100) which is online. The second set of information is based on responses from another electronic device (100) which is online when the user of the electronic device (100) raises the query. The online user can be either a student or a human tutor, a BOT, a call center or helpline, etc which can provide responses to the query raised by the user in real-time. The CVTO controller (184a) is also configured to determine a similar query raised by at least one another electronic device (100) based on the context of the query and obtain a third set of information based on responses to similar query. The third set of information is based on responses to the similar query for which may have been raised by another electronic device (100). The similar query can be for example "What is nucleic acid made of?" "Does nucleic acid contain protein or sugar?" "Are nucleic acid and biopolymers one and the same?", etc. Then the responses generated for each of these similar queries are related to the current query as well, and hence can be linked to the current query and provided as the third set of information. The above examples are used for illustrative purpose only and are not limited to the same. The first set of information, the second set of information and the third set of information may be collated from any single source of information or multiple sources of information. Also, the set of information is illustrated as three and may not be limited to the same based on the number of sources of information from which the responses are collated. The CVTO controller (184a) is also configured to determine at least one node of a plurality of nodes of the knowledge graph based on the context of the query for linking each of the first set of information, the second set of information and the third set of information and generate the knowledge graph by linking each of the first set of information, the second set of information and the third set of information to the determined at least one node. For example, the first set of information can be obtained from for example, search on a public search engine/database such as Google®, the second set of information based on the responses received in real time from another electronic device (100), and the third set of information is based on responses to the similar query may have been raised by another electronic devices (100) are all collated to be linked in the knowledge graph. The node is for example a common point at which the information can be linked.

In one case, the first set of information is provided as a first knowledge graph, the second set of information is provided as a second knowledge graph and the third set of information is provided as a third knowledge graph linked to form the knowledge graph. In another case, the first set of information, the second set of information and the third set of information can all be provided in a single knowledge graph. The at least one node of a plurality of nodes of the knowledge graph for linking each of the first set of information, the second set of information and the third set of information is manually provided to the electronic device (100). The knowledge graph comprises a plurality of subgraphs comprising additional information associated with the context of the query and is displayed based on one of user preference and the evolving tree.

The CVTO controller (184a) is also configured to generate a knowledge graph including the determined information and provide the knowledge graph to the received query as a collaborative virtual transparent overlay (CVTO). The CVTO controller (184a) generates the knowledge graph by determining a hierarchy for arrangement based on at least one of a user preference of information hierarchy, a source of the information, a mode of presentation of the information, a rating of the source of the information associated with the knowledge graph. For example, the information received from tutors may be given highest priority and placed at top of the CVTO followed by information from research papers, peer slides, etc.

Further, the CVTO controller (184a) is also configured to arrange the plurality of nodes of the knowledge graph based on the hierarchy for arrangement and provide the knowledge graph to the received query as the CVTO. The knowledge graph includes information associated with a specific context from plurality of information sources. The CVTOs can be for example invisible unless a user chooses to access the CVTOs and the creation and growth is performed intelligently. The CVTOs can be either specialized or have a common type i.e. the CVTOs could all be of same type example, videos or hyperlinks or the CVTOs could be mixed but come together to help expand the knowledge perspective through the inclusion of the additive subgraph.

In another embodiment, the CVTO controller (184a) is also configured to determine the information associated to a plurality of queries similar to the received query over a period of time and perform iterative improvement of the knowledge graph of the received query using Reinforcement Learning. Further, the CVTO controller (184a) is also configured to update the CVTO of the knowledge graph based on the iterative improvement of the knowledge graph. Therefore, the CVTO of the knowledge graph is dynamic is updated with content based on the Reinforcement Learning. This ensures that the user gets the most recent content. For example, the user can be provided with the most recent research papers, most recent videos, etc especially when provided eBooks related to high-end technology or most recent advancements such as COVID-19 pandemic. This will enable the user to be updated with the advancements in the field.

In another embodiment, the CVTO controller (184a) is also configured to create a table including the plurality of queries and at least one CVTO of the knowledge graph associated with the context and store the table comprising the plurality of queries and the CVTO of the knowledge graph associated with the context. The plurality of queries is added into a distributed Queue against a topic based on the context. The CVTO controller (184a) is also configured to receive a similar query provided by a user, determine at least one the CVTO of the knowledge graph associated with the context of the similar query from the stored table, and provide the determined at least one the CVTO of the knowledge graph associated with the context of the similar query. The CVTO of the knowledge graph includes multiple layers of information and is structured to expand based on user selection and each of the multiple layers of information is associated with a specific source of information. The CVTO of the knowledge graph is implemented in one of an augmented reality (AR) environment with the multiple layers of information augmented to the knowledge graph and a virtual reality (VR) environment.

In another embodiment, the CVTO controller (184a) is also configured to provide a plurality of questions to the user based on the access of the CVTO of the knowledge graph by the user periodically and determine a level of understanding of the user based on response to the plurality of questions. Further, the CVTO controller (184a) is configured to update the level of understanding of the user on an evolving tree periodically, modify the information in the knowledge graph based on the evolving tree; and update the CVTO of the knowledge graph based on the modification of the knowledge graph. The evolving tree includes a plurality of levels of understanding associated with a number of correct responses to the plurality of questions.

In another embodiment, the CVTO controller (184a) is also configured to provide an inquiry widget to determine an interest of a user in posing the query and receive a user response to the inquiry widget. Further, the CVTO controller (184a) is configured to modify the information in the knowledge graph based on the user response to the inquiry widget and update the CVTO of the knowledge graph based on the modification of the knowledge graph. Further, the CVTO controller (184a) is also configured to obtain a new set of information associated with a new context and provide an optional CVTO comprising the new set of information based on one of user preference, the evolving tree. The new context is linked to the context of the query.

In another embodiment, the CVTO controller (184a) is also configured to determine access of a specific set of CVTOs of specific knowledge graphs associated with the context by multiple users and automatically link each of the specific set of CVTOs of specific knowledge graphs associated with the context.

In another embodiment, the CVTO controller (184a) is also configured to embed the knowledge graph with the received query and the generated CVTO at a specific location of the content in the electronic document, wherein the knowledge graph and the generated CVTO is continuously updated based on reinforcement learning.

In another embodiment, the CVTO controller (184a) is also configured to determine a content present in the electronic document in the electronic device (100) and an existing learning management system (LMS), determine the context associated with the content and link the content present in the electronic document and the existing LMS to the knowledge graph based on the context.

In another embodiment, the CVTO controller (184a) is also configured to determine a level of understanding of the user, share the level of understanding of the user with another electronic device (100) and receive additional data from the another electronic device (100) to enhance the level of understanding of the user, wherein the another electronic device (100) is a tutor device. Further, the CVTO controller (184a) is also configured to update the information in the knowledge graph based on the received additional data; and update the CVTO of the knowledge graph based on the modification of the knowledge graph.

In an embodiment, the display (185a) is configured to display the knowledge graph to the received query as a collaborative virtual transparent overlay (CVTO). In another embodiment, the display (185) is configured to display the content in the electronic document with access to the at least one data in the Metaverse. The display (185) is capable of receiving inputs, comprises touch sensitivity and is made of one of liquid crystal display (LCD), light emitting diode (LED), organic light-emitting diode (OLED), etc.

Although the FIG. 1A shows the hardware elements of the electronic device (100) but it is to be understood that other embodiments are not limited thereon. In other embodiments, the electronic device (100) may include less or more number of elements. Further, the labels or names of the elements are used only for illustrative purpose and does not limit the scope of the invention. One or more components can be combined together to perform same or substantially similar function.

Figure 1B:
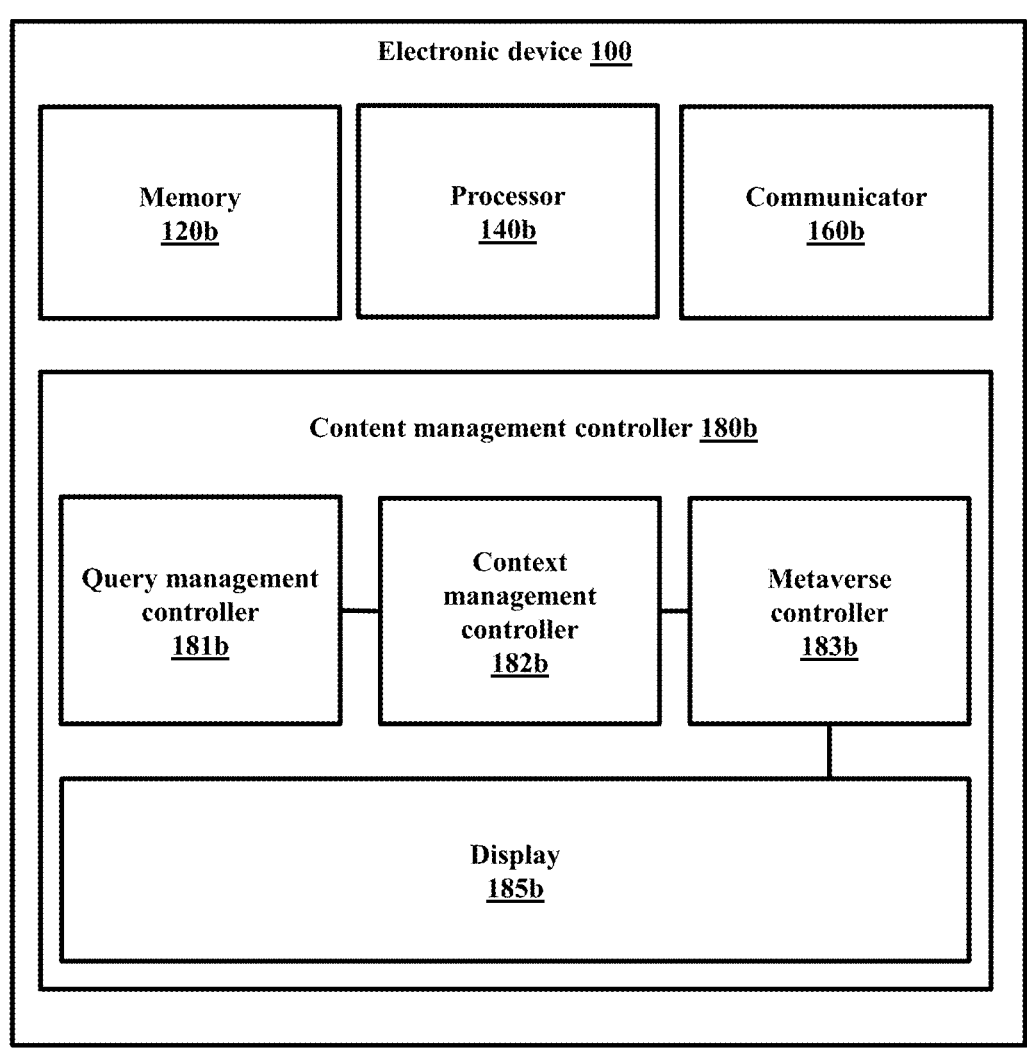
FIG. 1B is a block diagram illustrating an electronic device for providing information associated with a content in an electronic device using a Metaverse, according to the embodiments as disclosed herein.

FIG. 1B is a block diagram illustrating an electronic device (100) for providing information associated with a content in an electronic device (100) using a Metaverse, according to the embodiments as disclosed herein.

Referring to the FIG. 1B, in conjunction with the FIG. 1A, the electronic device (100) includes a memory (120b), a processor (140b), a communicator (160b) and a content management controller (180b). The content management controller (180b) includes a query management controller (181b), a context management controller (182b), a Metaverse controller (183b) and a display (185b). The memory (120b) is configured to store at least one meta information associated with a context of a query received from a user.

In an embodiment, the query management controller (181b) is configured to receive a query with respect to the content provided in an electronic document displayed by the electronic device (100). The content is a static text presented in the electronic document.

In an embodiment, the context management controller (182b) is configured to determine a context of the query and determine meta information associated with the context of the query. The meta information associated with the context of the query identity details of the user who raised the query, date of raising the query, date of modification of the query, file size, etc.

In an embodiment, the Metaverse controller (183*b*) is configured to determine a match between the meta information associated with the context of the query and at least one data in a Metaverse and link the meta information associated with the context of the query with the matching at least one data in the Metaverse. To link the meta information associated with the context of the query with the matching at least one data in the Metaverse, the Metaverse controller (183*b*) is configured to determine a tag associated with a journey of at least one another user traversing through the Metaverse based on the context of the query and the context of the content and then link the meta information associated with the context of the query with the journey of the at least one another user within the Metaverse. The matching at least one data includes information associated with the query. Accessing the plurality of other data associated with the context of the content includes interacting with the plurality of users of the plurality of electronic device (100) s in the collaborative learning environment. The Metaverse is created, updated and modified by a plurality of users of plurality of electronic device (100)s in a collaborative learning environment. The tag associated with the journey of the at least one another user is one of automatically generated based on learning and manually tagged by at least one another user of the plurality of users.

Further, the Metaverse controller (183*b*) is configured to select the at least one data in the Metaverse to access information associated with the query and enter the Metaverse at a point of availability of the at least one data comprising the information associated with the query. Further, the Metaverse controller (183*b*) is configured to access plurality of other data associated with the context of the content and exist the Metaverse at another point of the Metaverse. The plurality of other data is created, updated and modified by the plurality of users of the plurality of electronic device (100)s in the collaborative learning environment.

In an embodiment, the display (185*b*) is configured to display the content in the electronic document with access to the at least one data in the Metaverse. Further, when the user selects to enter the Metaverse, the display (185*b*) transforms and allows the user to enter the Metaverse. The display (185*b*) is capable of receiving inputs, comprises touch sensitivity and is made of one of liquid crystal display (LCD), light emitting diode (LED), organic light-emitting diode (OLED), etc.

Although the FIG. 1B shows the hardware elements of the electronic device (100) but it is to be understood that other embodiments are not limited thereon. In other embodiments, the electronic device (100) may include less or more number of elements. Further, the labels or names of the elements are used only for illustrative purpose and does not limit the scope of the invention. One or more components can be combined together to perform same or substantially similar function.

FIG. 2A is a flow chart 200*a* for a method for providing information associated with the content in the electronic device (100) using the CVTO, according to the embodiments as disclosed herein.

Referring to the FIG. 2A, at step 202*a*, the method allows the electronic device (100) to receive the query with respect to the content provided in the electronic document displayed by the electronic device (100). For example, as illustrated in the FIG. 1A, the content management controller (180*a*) of the electronic device (100) is configured to receive the query with respect to the content provided in the electronic document displayed by the electronic device (100).

At step 204*a*, the method allows the electronic device (100) to tag the received query with at least one context of the plurality of contexts. For example, as illustrated in the FIG. 1A, the content management controller (180*a*) of the electronic device (100) is configured to tag the received query with at least one context of the plurality of contexts.

At step 206*a*, the method allows the electronic device (100) to determine the information associated to the received query based on the context of the query. For example, as illustrated in the FIG. 1A, the content management controller (180*a*) of the electronic device (100) is configured to determine the information associated to the received query based on the context of the query.

At step 208*a*, the method allows the electronic device (100) to generate the knowledge graph comprising the determined information. For example, as illustrated in the FIG. 1A, the content management controller (180*a*) of the electronic device (100) is configured to generate the knowledge graph comprising the determined information.

At step 210*a*, the method allows the electronic device (100) to provide the knowledge graph to the received query as the CVTO. For example, as illustrated in the FIG. 1A, the content management controller (180*a*) of the electronic device (100) is configured to provide the knowledge graph to the received query as the CVTO.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 2B is a flow chart 200*b* for a method for providing information associated with the content in the electronic device (100) using the Metaverse, according to the embodiments as disclosed herein.

Referring to the FIG. 2B, at step 202*b*, the method allows the electronic device (100) to receive the query with respect to the content provided in the electronic document displayed by the electronic device (100). For example, as illustrated in the FIG. 1B, the content management controller (180*b*) of the electronic device (100) is configured to receive the query with respect to the content provided in the electronic document displayed by the electronic device (100).

At step 204*b*, the method allows the electronic device (100) to determine the context of the query. For example, as illustrated in the FIG. 1B, the content management controller (180*b*) of the electronic device (100) is configured to determine the context of the query.

At step 206*b*, the method allows the electronic device (100) to determine the meta information associated with the context of the query. For example, as illustrated in the FIG. 1B, the content management controller (180*b*) of the electronic device (100) is configured to determine the meta information associated with the context of the query.

At step 208*b*, the method allows the electronic device (100) to determine the match between the meta information associated with the context of the query and at least one data in the Metaverse. For example, as illustrated in the FIG. 1B, the content management controller (180*b*) of the electronic device (100) is configured to determine the match between the meta information associated with the context of the query and at least one data in the Metaverse.

At step 210*b*, the method allows the electronic device (100) to link the meta information associated with the context of the query with the matching at least one data in the Metaverse. For example, as illustrated in the FIG. 1B, the content management controller (180b) of the electronic device (100) is configured to link the meta information associated with the context of the query with the matching at least one data in the Metaverse.

At step 210b, the method allows the electronic device (100) to provide the content in the electronic document with access to the at least one data in the Metaverse. For example, as illustrated in the FIG. 1B, the content management controller (180b) of the electronic device (100) is configured to provide the content in the electronic document with access to the at least one data in the Metaverse.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3:
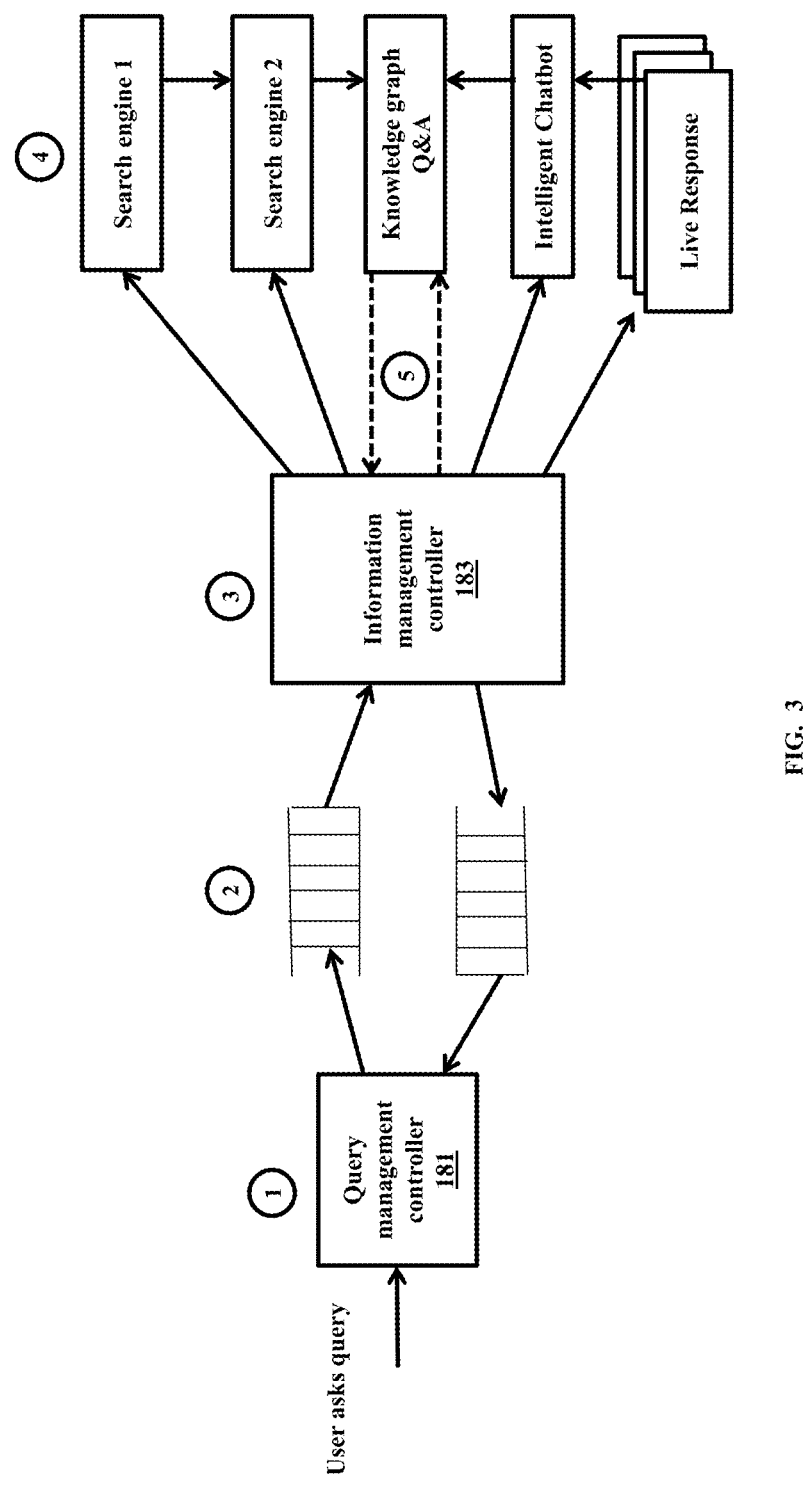
FIG. 3 is a schematic illustrating a method for generating the knowledge graph, according to the embodiments as disclosed herein.

FIG. 3 is a schematic illustrating a method for generating the knowledge graph, according to the embodiments as disclosed herein.

Referring to the FIG. 3, at step 1 the query management controller (181) of the electronic device (100) receives the query and identifies the context of the query provided by the user. At step 2, the multiple queries may be queued up and at step 3 the information management controller (183) determines the response to the queries from multiple sources of information. At step 4, the multiple sources of the information includes for example but not limited to search engine 1, search engine 2, intelligent charbots, live responses, etc. At step 5, the electronic device (100) generates the knowledge graph using the information from multiple sources and either uses the knowledge graph to generate the CVTO or presents the knowledge graph itself as the CVTO. The CVTO is presented to the user as and when the user wishes to see the additional information or when the user has the query.

The entire method of providing the information can be operated remotely. The application for providing the information runs on a remote server and the user uses VNC or Remote Desktop to view and interact with the application. Here both the eBook and the services are remote, as a result can allow complicated value added services to run without significant distribution and reduces memory and processing power requirement at the electronic device (100) through which the user is accessing the eBook. The eBook itself can be hosted remotely and need not be downloaded to the user's electronic device (100) or stored locally. The user's usage can be tracked based on the number of pages read, clicks and requests to the electronic device (100). Further cloud storage is usually much larger than local with eBooks. In an additional embodiment, the application can run on a server in the home or a more conventional desktop or laptop as opposed to the eBook.

In another embodiment, the proposed method uses selective remoting by which some sections of the application are remote. Thus the electronic device (100) comprising the eBook can be remote, while the overlay runs locally. One embodiment of this could be where the raw eBook is remote and what runs local is also the overlay presentation module. Further it is also possible for some Overlays to be local and others to be remote.

Apple's ARKit, Google Glass and Facebook's Aria and Oculus offer augmented reality technology which can be incorporated in the eBooks along with the proposed method for enhancing the quality and efficiency of the eBooks.

Generally, the AR devices are made for virtual transparency and VTOs can be used beyond the eBooks. For example, a visitor to a museum could navigate various artifacts and learn much more about the artifacts while walking around. In this case, a camera of an artifact, (say a vase or a statue or a skeleton) could be enhanced with a covering description of eBooklet that scrolls along with additional videos and information. However, it can also work with traditional eBooks. One embodiment is that an AR glass could display the VTOs while the book's text could be displayed on a traditional eBook reader. Alternatively, a portion of the book could scroll before the user as he browses while also providing the user perspective on the whole page which is remote.

Inversion of the eBook and the VTO happens when the user primarily wants to rely on the VTO first and the eBook second. This might be even a college student who relies first on the professor's lecture and then there are inverse links from the lecture to the eBook. The inversion of the eBook and the VTO is incorporated using Automatic Speech Recognition (ASR) and image and video recognition to discover the topics and the sub-topics from the board or electronic Board or tablet used by the professor. The topic is then linked to the eBook (and from there into associated secondary VTOs) and the particular page can be brought up to help the student learn the associated eBook text. An important advantage of this method is to help students who rely largely on lectures to also learn from the eBooks. Slides covered by a lecture can also be enhanced by integrating particular sections of the lecture into the slide deck. This could be either the audio section or the video itself. Further references from slide presentations back to the eBook are also achievable using the VTOs on the slide deck. The links between content and media can be done through topics, keywords, syllabus, etc.

Figure 4:
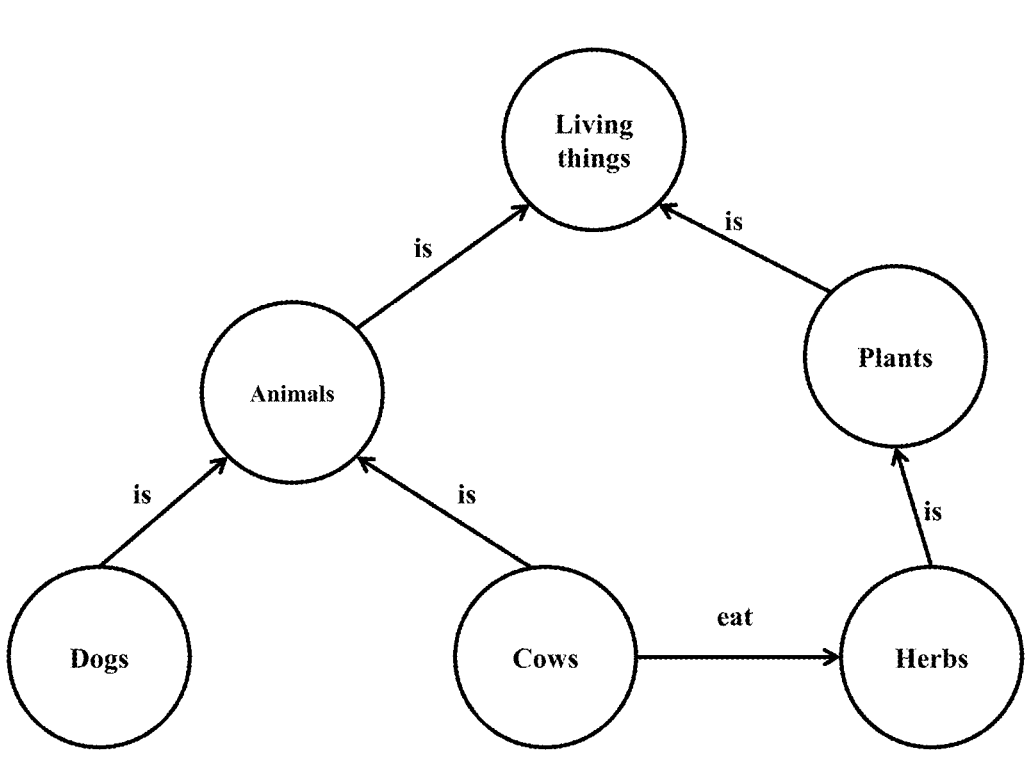
FIG. 4 is an example illustrating creation of the knowledge graph from the eBook, according to the embodiments as disclosed herein.

FIG. 4 is an example illustrating creation of the knowledge graph from the eBook, according to the embodiments as disclosed herein.

Referring to the FIG. 4, conventional methods create the knowledge graph from the eBook source or any text document using natural language processing (NLP) engines. Conventionally the knowledge graphs are built using JavaScript Object Notation for linking the data (JSON-LD). The method of generating the knowledge graph includes extracting a plurality of entities from the ingested document. The next step includes extracting a relationship with respect to each of the entities of the plurality of entities. Further, the method includes generating the knowledge graph with connections between the each of the entities. For example but not limited to Knowledge Graph Toolkit (KGTK) from University of Southern California, the JSON-LD, etc. Also, a plurality of graph databases also exists such as for example but not limited to Cayley which supports nodes and linkages in billions. The JSON-LD allows for data typing.

Referring to the FIG. 4, provides the example illustrating creation of the knowledge graph from the eBook related to living beings including entities such as living beings, animals, plants, herbs, cows, dogs, etc. Initially, the entities are extracted and then the relationship between each of the entities is determined, then the knowledge graph is generated based on the relationship. For example, the cow is an animal but eats herbs (plants). Therefore, the cow falls under both the categories of animals and plants which are both living beings.

Further, the knowledge graph can be provided as the VTO types. The types are additions of sub-graphs that can be added to the knowledge graph dynamically thus facilitating expansion of the knowledge graph, dynamic discovery and enhancement of the knowledge bases. The sub-graph can include a set of videos for instance, that expound a series of concepts about a particular topic that are added in to help the student better understand a particular area of study. The sub-graph can include a mix of videos and hyperlinks to enhance knowledge related to a group of concepts with additional information associated with the main concept. Once the relationship between the entities is developed, the same can be transmitted across services, edge devices and end user devices.

Unlike to the conventional knowledge graphs, in the proposed method the knowledge graphs generation goes beyond the knowledge extractable from the basic entities from the eBook which is done by using the concrete text that is being studied or the subject and is used for enhancement. The VTOs can be layered and structured to expand on details not just of the underlying material but the material of the VTO levels below.

Further, the proposed method of generating the knowledge graphs includes building separate knowledge graphs from multiple sources, including eBooks, slides, the quizzes, the questions and the videos. The knowledge graphs can then be merged or linked together. Alternatively, a common knowledge graph can be built with the source being an attribute.

The knowledge graph is used as the basis of the meta knowledge gained about the text/entities. The knowledge graphs are used to build representations of knowledge in a Semantic Web using free form semantic interlinking of the entities. Further, as done conventionally, multiple tools can be used for the creation of the knowledge graph which conveys the linkages to secondary tools.

The creation, storage and transmission of the created knowledge graph could be as a tab separated (TSV) or a comma separated file (CSV) with nouns and verbs representing entities and relationships respectively. But the same can also be achieved through the JSON-LD and the use of databases like the Cayley.

FIG. 5 is an example illustrating a knowledge graph provided as the CVTO in the eBook, according to the embodiments as disclosed herein.

Generally, the syllabus of a book or the eBook is a tree of knowledge consisting of branches of subjects that can be explored by the student in a recommended order. The syllabus includes interrelationships between the branches of subjects that are part of a curricular outline. As a student explores the tree, he discovers material that he or she needs to know or understand better to understand additional material. At the outset, the tree is defined by a syllabus outlined by an organization, which is either a regulatory body (example a College Board) or a teaching body (example a school or a university). As the student reads through the tree, new branches of the subject are studied. However, there may be some branches of the knowledge tree/syllabus which requires prerequisite bodies of knowledge which the student needs to know before studying the new branches of knowledge. For example, Calculus is a prerequisite for exploring advanced topics in Physics. Similarly, Chemistry and Biology are prerequisite for a study of Physiology and Pharmacology. The proposed knowledge graph is provided such that the knowledge graph expands in ways that the students seek to explore the new fields of study. The students acquire a Cumulative Body of Knowledge (CBOK) that can expand only after additional higher level branches are explored and acquired in the knowledge graph. For instance, prior to studying statistical mechanics, a student of Physics may need to learn Statistics or expand his knowledge of calculus.

However, there can be a scenario where the student is reading the eBook comprising the interlinked knowledge graph entities but the student already have significant understanding and knowledge of the some portions of the content. Then the student may not want to revisit the portions which they are aware of already. Therefore, the proposed electronic device (100) determines a "pre-traversal" already completed by the student and determines the portion of the content that is known and understood by the student accessing the eBook. The student may then be provided an option to either skip the pretraversed portions known or to re-traverse the portions known.

The electronic device (100) determines the level of understanding of the student based on the response to the multiple questions displayed to the user based on the access of the content and the CVTO of the knowledge graph by the user periodically. Further, the electronic device (100) updates the level of understanding of the user on the evolving tree based on the number of correct response to the multiple questions and modifies the information in the knowledge graph based on the evolving tree.

The knowledge graph is provided as the VTO that is displayed to the user. The entities related to the content offers a second means to help the user understand related entities. The VTO can also include the pre-traversed tree or a list of possible related elements can be provided. Further, the electronic device (100) adds the associated context sensitive content as structured overlays that target the desired traversal elements or the non-pre-traversed elements. The updated VTO reflects additional material that is an extension of the eBook or the e-text or the eDocument.

Referring to the FIG. 5, content related to electron shells is provided on the electronic device (100). The content in bold including shells, subshell, orbitals, etc. is the entities determined by the electronic device (100). In conventional methods the entities may be a hyperlink giving extra information associated with the entities. In the proposed method the electronic device (100) generates the knowledge graph indicating the relationship between each of the entities extracted. Further, the electronic device (100) provides the knowledge graph as the VTO with additional information extracted from additional sources such as videos, tutor slides, images, etc. as shown in the FIG. 5.

The electronic device (100) can generate the explicit knowledge graph which is shown to the student either as a knowledge graph or as a similar figure or visual. The student sees the nodes in the knowledge graph and has the associated topics or words and related videos, slides, wikilinks and other teaching elements that help the student discover and learn the knowledge graph. There can be VTOs that are explicitly introduced in the context additional element of the knowledge that the student discovers. The knowledge graph can be expanded to include invisible sub-graphs (or subgraphs that is invisible earlier) through the VTO links.

The electronic device (100) provides collaborative analysis with supervised and unsupervised learning. In the unsupervised learning, there is no "Tutor" who is human or machine for improving or tuning the technique of providing the information associated with the content. The electronic device (100) automatically tunes itself.

In another embodiment, the electronic device (100) performs unsupervised learning where the tutor who understands the material and can "train" the electronic device (100) is allowed to create and design the VTOs associated with each node or relationship in the knowledge graph. In the example described in the FIG. 5, the tutor can add videos for the orbitals, have a number of slides that explain each of angular momentum numbers, etc. Therefore, here the tutor decides based on manual monitoring of the student, advancement/updation in subject content, etc. to add information associated with the same to the knowledge graph. In case of the unsupervised learning, the expansion of knowledge and the content happens with the aid of the students or readers themselves. During the course of reading the content, the student or the user may have discovered additional resources associated to the content or the electronic device (100) helps the user to discover the resources using a simple search on the web. Both the unsupervised learning and the supervised learning by the electronic device (100) enables addition of new VTOs that deal with different videos for instance, each of which enhances a particular knowledge element in the knowledge graph.

Further, the electronic device (100) allows the tutor (an entity) to add assessment modules, quizzes, additional study modalities like videos, slides, tutorial sheets, and lab experiments, etc. The traversal of the user is also recorded by the electronic device (100) and available to the user. Using artificial intelligence markup language (AIML) the electronic device (100) can machine generate a new VTO or the subgraph from a new knowledge source or modality and then add the new VTO to the exiting knowledge graph's VTO. As the user learn from a same source, the discovery of new related entities can also lead to those sources becoming available to later users and the addition of these as VTOs.

Figure 6:
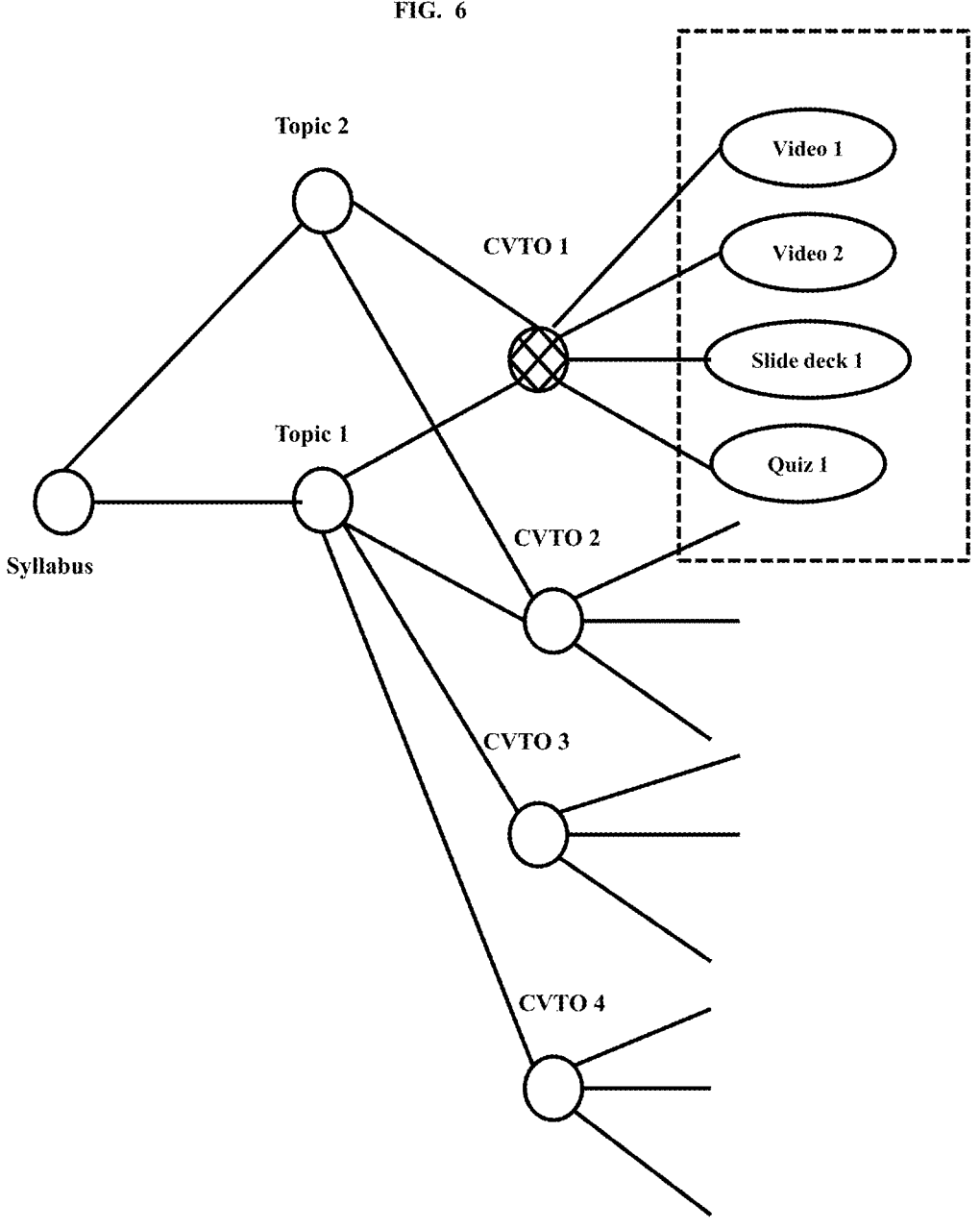
FIG. 6 illustrates conceptual tree based view of the virtual transparent overlay model, according to the embodiments as disclosed herein.

FIG. 6 illustrates conceptual tree based view of the virtual transparent overlay model, according to the embodiments as disclosed herein.

Referring to the FIG. 6, the conceptual tree based view of the knowledge graph as the VTO is provided. The syllabus is connected to the eBooks and either eBooks or the syllabus contains topics and sub-topics. The electronic device (100) can also generate implicit knowledge graphs such that the knowledge graph is not exposed to the user generally and is only exposed to training professional or an administrator or tutor or teachers. There is no interaction with the student around the knowledge graph.

As the user explores new learning through the VTO, these lead to opportunities for expanding the Virtual Overlay framework that exists between topic, text in the eBook and a cluster of videos or videos and Quizzes or videos and slides. These VTO based knowledge graph relationships are expanded through collaborative discovery.

Even while students explore the knowledge graph, laid out for preparatory study of a particular field, the student will need to further explore prerequisite branches of study prior to further exploring a particular branch of study. Syllabuses have implicit ordering often that do not lay out explicit ordering of subjects but they often are required. The expansion of study at further levels of detail also implies priority and prerequisite requirement.

Further, there may be certain aspects of the study that require knowledge of sub-topics that provide the basis or fundamentals for the students to study and know well before embarking further down the particular branch or a sister branch. This implies that ordering by way of learning and expertise building is preferred or essential. Gaining expertise in an area of study represented by a knowledge graph can prove hard if one skips subsections of a sub-branch prior to explore sections of another branch. For example, the user needs to be aware of Biot-Savart's Law prior to exploring and understanding Mechanics of Newton and subjects around force and torque. In another example, exploring the study of Solutions prior to Rate Laws in Chemistry is required.

In structured programs in a school or a college the above mentioned enforcements are natural as teachers tend to maintain order in exploration of concepts. But in less structured programs, the lack of requisite knowledge often can prove difficult to follow. For example, many students may begin a new course in Artificial Intelligence without ever studying Data Structures or exploratory Programming Languages or Data Science. Therefore, it is necessary that the structured programs like Collaborative Learning through Distance Education expand capabilities to facilitate this problem in learning and exploration. The proposed method addresses the above mentioned problem as:

(A) Electronic device (100) provides mechanisms for collaborative reporting and discovery—example: Student A discovers that he or she does not know a particular subject prior to further exploration and therefore includes dotted lines to other bodies of knowledge worth learning prior to such further exploration. Student A records his experience and Student B learns from A's recommendation (B) Electronic device (100) provides mechanisms for inquiry—e.g. Student A discovers that he or she is finding certain concepts in a particular subject difficult. The student enquires about what might better help in better understanding the portions. Either one of the teacher, tutor or fellow student recommends a new body of knowledge for the Student A to explore prior to further study of the subject they find difficult. This inquiry is then reported and introduced as a "Collaborative Learning" discovery in the CVTOs or as a question mark (as provided in FIG. 8 step 2).

(C) Electronic device (100) provides mechanisms for supervised learning where human tutors and tuning experts collaborate with the students and enhance programs based on student input. While Supervised learning is known in the art, enhancing or expanding VTOs or creating new VTOs to help students is provided by the electronic device (100) in the proposed method.

The electronic device (100) allows the CVTOs to be most effective and efficient as the CVTOs updates with time and improves with more users input and interaction between the users. Further, the CVTOs can be personalized to the specific user. As provided in the FIG. 6, each student exists at a unique point in the "evolving" tree/knowledge graph. The level of understanding of the student at any point of time exists at a specific point say for example, introductory then the student is at the syllabus point which indicated that the student is yet to delve into the subject. Another student may be at quiz 1, which means that the student has read topic 1 and may have access the information from other sources provided in the CVTO 1 before accessing the quiz 1. Therefore, the level of understanding of the first student and the second student are different. Therefore, while updating the knowledge graph for the first student and the second student the level of understanding of each of them needs to be taken into consideration. The evolution of the learning material is also "collaborative" in the sense that the electronic device (100) absorbs inputs from a variety of sources and the electronic device (100) adapts to the evolving level of understanding of the student.

Therefore, the electronic device (100) provides the CVTOs comprising dynamically adapting content where the content adapts based on individual needs of the students both at a group level or personal level. The CVTOs can be structured or layered. The CVTOs can be designed based on user preferences. For example, a user may want to see only portions that are relevant enough to get a basic idea of the text or concept or topic being studied. Another student may be studying the ideas to obtain a far deeper level of knowledge. For instance, a legal scholar may seek to understand not just the law but also all precedents involved and how it has been applied and the various pieces of legislation as well as the cases that came to shape its current state of evolution. The CVTOs can include different cross cutting concerns, be it legislation, cases, common laws as well as videos and news items related to each of these. Based on the levels of knowledge sought, different legal scholars may be looking at different levels and different branches in the tree of knowledge.

In another embodiment, an adaptive individualization of the CVTOs is provided by the electronic device (100) which is a way of collaborative learning which can help different students with different backgrounds to achieve learning goals. In a plain old document in html or pdf there is almost no adaptation as they are a basic presentation of text, images and data.

The CVTOs provided by the electronic device (100) are a means of separating with delivering and presenting "Concerns" of the users/student. Further, along with the separation of concerns, the cross-cutting of concerns is also provided by the electronic device (100). The CVTOs allow the separation of supporting content and their delivery as context oriented content into the field of presentation of any particular body of knowledge. The aim of individualization is to facilitate personalization, customization and progression of the CBOK to help learners better explore what can be considered as custom concerns in specific overlays. In an example, the CVTOs can be used as innovative and capable tool that can transform existing static Internet content such as the eBooks and enhance media formats by providing extensible support that can be both online and context driven. One possible embodiment could be to consider different genre of context oriented content as "a separate set of concerns". Each CVTO layer would then embody a genre or group of concern that provide context oriented content as "separate concerns" which is implemented on the backend using Aspect Orient Programming. Thus one set of aspect can involve videos, another slides, another hyperlinks, another social media group interactions, etc. Here, the "concerns" are a set of information that allow a group of context oriented content to be grouped together and implemented as an optional VTO that is available to some or all users based on the level of understanding of the user and the user preference. For example, a learner of Physics who may not have studied Calculus in detail previously may need additional explanations related to terms, symbols and concepts of the Calculus. However, another learner who may have studied the Calculus previously may not need the CVTO or may not have a requirement for such a "concern".

Context oriented content associated with the subject, the syllabus, the chapter, the topic (or even the word) is provided as the CVTO. The context can be for example a topic or a sub-topic. At the narrower levels of the topic and the sub-topic, the CVTO can offer a particular content. But over the content of the topic and the sub-topic, the electronic device (100) can overlay different and particular words. The electronic device (100) provides adaptation and intelligence mechanism to select the words at which point in time, and can be personalized to a particular student, a group of students or others. The process of selection by the electronic device (100) uses AI based deep learning techniques using Neural Networks based NLP and reinforcement learning to optimize and improve the success of the adaptation.

The electronic device (100) includes intelligent aspect oriented programming to implement the CVTOs. The electronic device (100) with the intelligent aspects is capable of determining the needs of the user based on the user's own interactions and those of others with a similar background or who are similar to the particular class of users. The aspects control a "View" of the CVTOs (as in Model-View-Controller) and adapt the CVTOs for the user based on the user preference and the goals in the learning with time frames for study. Consider a scenario when the user is learning with the goal of doing so rapidly (example, for a lecture) and another scenario when the user is studying for a competitive exam. In the scenario of the user studying for the competitive exam, the user needs to revise the study material repeatedly. Therefore, the electronic device (100) adapts the overlay to the goal of the user and the level of knowledge or expertise.

Further, the electronic device (100) allows the separation of the CVTOs with each CVTO dedicated to a set of concerns. Independent of the specialization of the CVTO based on the concern the CVTO draws upon; the electronic device (100) works considers the content and the users past history with respect to the part of the content and with related content. For example, a first time student of Differential Equations could be a high schooler. A student pursuing a PhD in Applied Mathematics or Financial Engineering could also be a student of the Differential Equations. The "Concerns" could be different in both the scenarios. Also, the goals could be different in both the scenarios. The high schooler could want to learn the subject to prepare himself for an upcoming AP exam. The PhD student could have different concerns like for instance to find a solution to a particular type of differential equation he has encountered. This creates reasons for the VTOs to be intelligent and adapt to both the user and the goal at the time of his or her study.

Various machine learning (ML) techniques may be used for implementing the CVTOs to achieve intelligent aspect oriented programming. Intelligent Aspects could also include questions and quizzes (as one aspect as well as added information (as another aspect) that help the user. Intelligent Aspects could also be used as part of the delivery of videos or Wikipedia or references to slides.

Various tools developed for the generation of the adaptive and intelligent CVTOs. One example is the tool to produce intelligent overlays using JSON-LD based techniques. A second tool is used to develop the CVTO for a multimedia "Collaboration on Demand" option. Another tool could help synchronize videos with slides. Given a video presentation of a slide deck, the individual slides in a slide deck itself can have links to specific places where the Slide is being taught.

Figure 7:
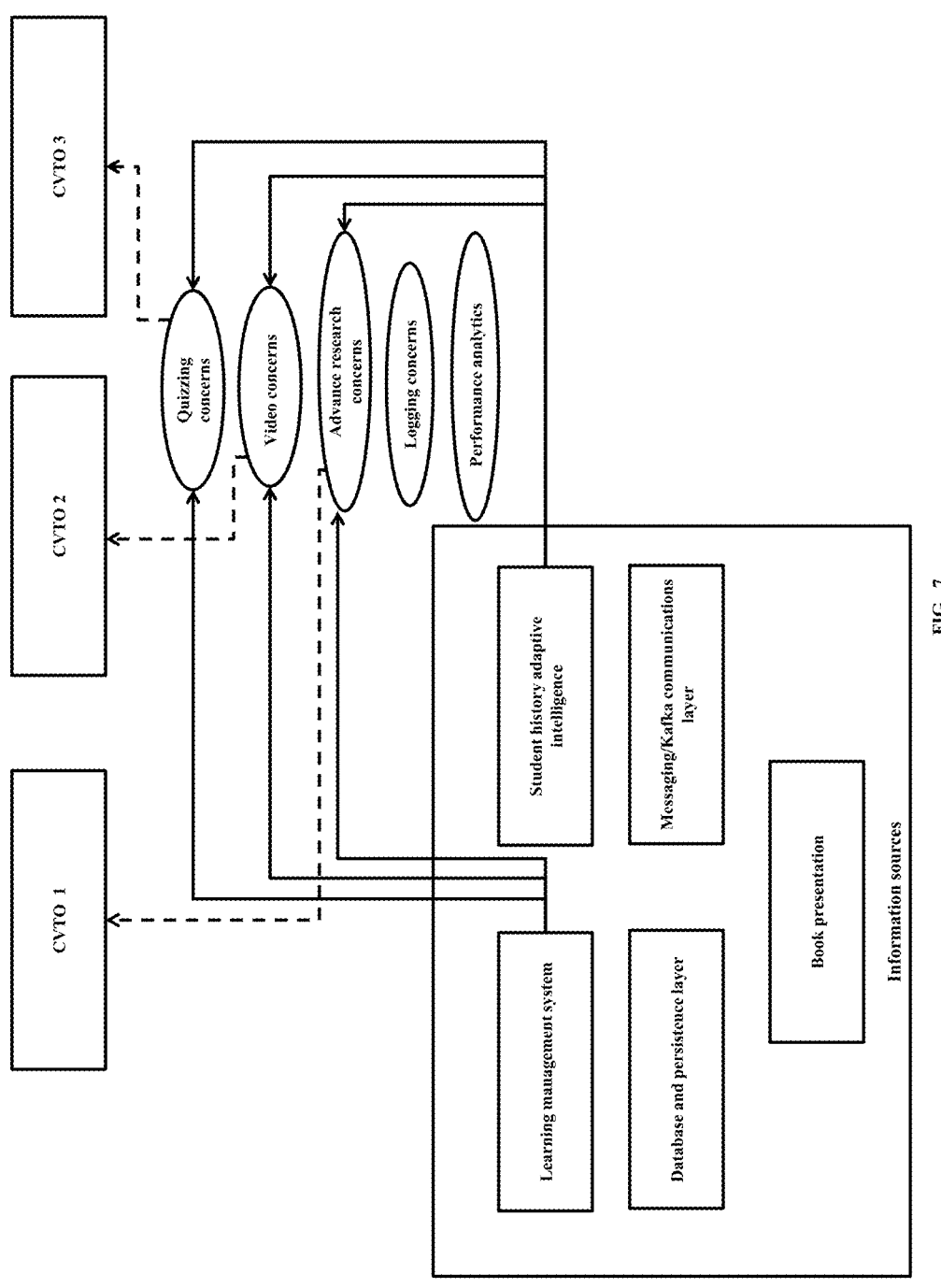
FIG. 7 illustrates use of cross cutting concerns to feed data into particular CVTOs, according to the embodiments as disclosed herein.

FIG. 7 illustrates use of cross cutting concerns to feed data into particular CVTOs, according to the embodiments as disclosed herein.

Referring to the FIG. 7, provides the details of feeding the data into particular CVTOs using cross cutting concerns like Advanced Research Concerns, Video Concerns, Quizzing Concerns, etc. The proposed method considers the interest of the student at a point in time such as revising material to gaining a more perfect knowledge to deep research in the field. At the point of the particular interaction with the material, the electronic device (100) gets the understanding of the student's interest. The electronic device (100) provides the "inquiry widget" that helps the student to determine their interests and the "inquiry widget" could be specific to the particular text or generic to the student's timeline. The "inquiry widget" is added as part of the overall student engagement. For example, the student could be preparing for a quiz the following day or an exam sometime in the future and the requisite knowledge level may be cursory or expert. The electronic device (100) uses the knowledge gathered about the student interest to build the necessary cross cutting concerns. The electronic device (100) feeds the particular set of cross cutting concerns as input and helps determine the actions of the particular overlay.

Consider an example scenario where students would have to study a subject twice, for instance AP Physics is studied once at High School and again at College based on what the student seeks to major in. However, greater learning of a particular section of the subject happens later. A student going on to major in Physics or Electromagnetics or Electrical Engineering might learn the same material multiple times at multiple levels of depth and understanding based on his or her focus. The electronic device (100) determines the level of understanding of the user and dynamically generates the overlay. In another example, level of mathematical comprehension of the subject may vary. Understanding Quantum Mechanics based on the level of Statistical mechanics applied. Most often students read textbooks and learn from different textbooks. Sometimes it becomes difficult for students who have to relearn material again entirely. The electronic device (100) determines the underlying material incrementally or morph or change the CVTOs to provide additional learning based on the particular goals and need of the student. The morphing of the CVTOs can be accomplished via the concept of "advise" in for example aspect oriented programming.

Figure 8:
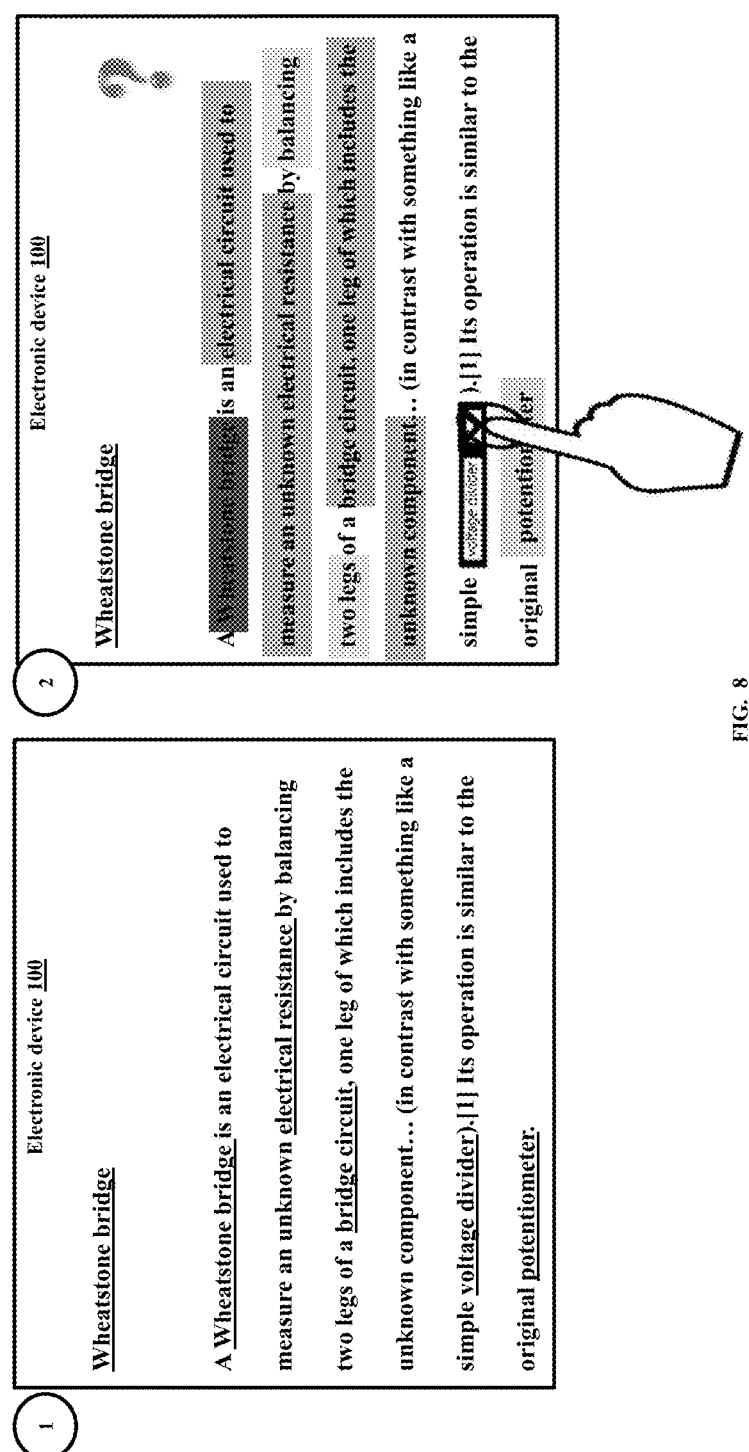
FIG. 8 is an example of providing information associated with the content in the electronic device as the CVTOs, according to the embodiments as disclosed herein.
Figure 8:
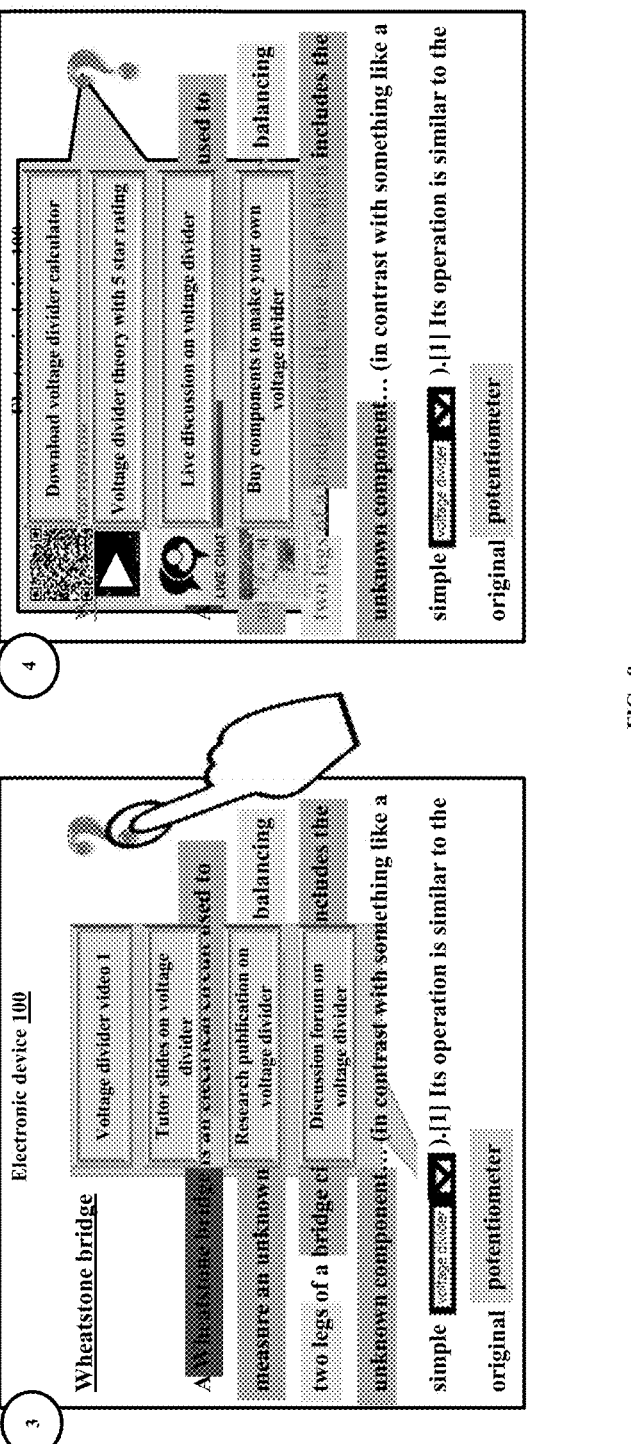

FIG. 8 is an example of providing information associated with the content in the electronic device (100) as the CVTOs, according to the embodiments as disclosed herein.

The highlighting and the transparent overlays of various varieties are performed by the CVTO controller (184*a*). An overbar vinculum, an underline or a translucent colored pen that covers the text that is being enhanced is known in art. The proposed method includes multi-tiering with the CVTOs. Referring to the FIG. 8, Wikipedia® defines a Wheatstone Bridge as provided. Each of the translucent text elements is a hyper-link to another Wikipedia® page. Individual keywords are the means effectively highlighted by color changes (typically in Wikipedia®). The proposed method provides the multi-tiered system. In addition to the original hyperlink based highlighting a second layer is added.

According to the proposed method, the electronic device (100) provides single or multi combinational highlights based on user history and a level of understanding of the user. At 1, a traditional hyperlink page as in a browser is shown according to the prior art. At 2, red-green highlight provides links to images and pictorial representations and a green highlight provides 20 second videos related to the content highlighted. The yellow highlight provides an audio cue that discusses how balancing of two legs happens. "Voltage Divider" has multiple overlays and is a dropdown menu that allows for a choice of actions. At 2, as the user selects the dropdown menu a plurality of links associated with the "Voltage Divider" are provided in the multiple overlays, as shown in step 3. At step 3, a single overlay associated with the "Voltage Divider" includes multiple overlays of the multiple sources of information.

At 4, a side bar indicating a social media style discussion on the topic is provided by the electronic device (100). A question mark is used for example, to disclose that there are questions associated with the specific section of the content in the eBook. The CVTOs are provided based on the user's goals as any combination of the above mentioned options. Here various questions along with answers to the corresponding questions previously asked by other users, raised by tutors, etc. can be collaborated and provided based on relevance to the user query. Further, the user may also be provided options to arrange the questions along with answers in a prioritized order or based on review ratings to help the user get the best results first.

Figure 9:
FIG. 9 is an example of overlaying financial statements for providing information associated with the content in the electronic device, according to the embodiments as disclosed herein.

FIG. 9 is an example of overlaying financial statements for providing information associated with the content in the electronic device (100), according to the embodiments as disclosed herein.

In an embodiment, the electronic device (100) provides more conventional choices pre-worked or hardwired into the software that controls the generation and display of the CVTOs. An advice option deals with a class of functions which have the ability to alter or change other functions when those functions are running. Thus, it can be a certain function or method that is to be applied at a given join point. For example, when a student is younger and indicates that he or she is struggling to understand the material the first time, the "advice option" could be both to offer the student a set of wiki based clues that introduces the CVTO on the words, topics or concepts that require explanation or further delineation. The electronic device (100) includes deep learning techniques for Natural Language processing to learn about users as well as their likely needs as well as based on information about a particular user to more closely customize the CVTOs.

The electronic device (100) allows the collaboration of the text document/eBook across time. The author, a proxy who is a teacher, or a tutor, may, over a period of time, want to help the readers better understand what the user sought to express. The author may also want to add additional information on the text. To facilitate the additional information the electronic device (100) generates the updated CVTOs that reflect the authors added thoughts on the subject. Further, the students may raise questions on the material that the author may then answer which is also generated by the electronic device (100) as the updated CVTO. The collaboration across time can mold and improve the eBook and expand the knowledge of not just the student but also the author using the generated CVTOs.

In the context of lawyers or legislation creators working on a common document, there is significant effort that occurs over a period of time as the details are ironed out. Such collaborative action on the same document can be facilitated by the electronic device (100) by providing the CVTOs that facilitate greater collaboration by adding auto-referencing, topic-based detailing etc.

In another embodiment, the electronic device (100) provides collaborative learning on demand by displaying a "Click to discuss" option or "Click to Learn" option. The collaboration on demand helps the student to address doubts or receive clarifications even as the student is perusing through the material. The collaboration on demand form of the CVTOs is a "social media" construct that can help the student pose a query and get it answered. The collaboration on demand option may be provided as part of a value added service or a learning course when the eBook is purchased.

Further, the interactions during the access of the "Collaboration on Demand" are also performed. The recording is an immutable multimedia interaction. The CVTOs on top of the recording though post-event can help achieve significant collaboration and provide greater level of clarification to any user accessing the eBook. The collaboration can be performed in the "Collaboration on Demand" option at two different levels I.e., between two devices accessed by equal users and between two devices accessed asymmetric users. For example, in medicine, a Physician and a Radiologist could be collaborating as equals while a physician and a patient could be collaborating on asymmetric terms where the physician knows more about a particular disease, drug or therapeutic than the patient. In this case, collaboration could occur through offline discussion around a piece of communication (on a request for a test for example) or online as when a patient seeks to discuss online a prognosis made. Similarly, in another example, in finance, understanding valuation of a security could be an asymmetric dialog between a sell-side security analyst and a buy-side decision maker with limited time to assess pros and cons of a purchase at a point in time. Here too, there is the possibility of collaboration across time and on demand. A buy-side decision maker may need further information around the bid-ask spread, the change in volume, financial statements as well as sophisticated details from the company's annual report (usually a large document) or even the CVTO involving a CNBC dialog with an executive of a company or an earnings call. When the collaboration occurs with the sell-side security analyst over a short but detailed Collaboration-on-Demand over several of the mentioned details, collaborative notes may be added in a new CVTO as they collaboratively browse over the annual report. The buy-side decision maker then has a period over which the results of the discussion are available to aid in taking the decision. A bulk of information may need to be digested and "replayed" to the buy-side decision maker or even a second person involved in the decision making process at a later point in time when some of the information may have been updated. (e.g. new financial statements or quarterly report (10-Q)).

Financial statements are similar to the eBooks with additional attributes. The financial statements represent an evolving set of information that represents the changing financial picture associated with a company. The financial statements happen over a set timeline and the context of a particular industry.

The financial statements form a core disclosure to the public regarding financial transactions of the company. In explaining investments to the public investors companies often disclose significant details that are poured over by many serious analysts and institutional investors as well as individual investors. A broadening of public markets leads to less time amongst analysts and investors who have to digest new information in shorter periods of time. The time sensitive nature of stock markets further adds to the need for rapid assimilation. The ability to integrate conference call associated with the financial whereabouts which includes an audio or an audiovisual presentation along with slides needs to be performed.

Further, there can also be question and answer sessions that follow the call. Many news channels like CNBC, Bloomberg and others in the US have analysts' opinions during or after the call. Two forms of VTO information can be provided. (A) Quarter to Quarter changes or time-series information is peppered throughout a 10-Q and linking this time series could be valuable to analysts and investors as well as company personnel. It is notably present with respect to Financial Statements like Income Statement, Cash Flows and Balance Sheets. The impact of decisions made can be seen in the language of financial statements. Often the financial statements are presented year over year. (B) Further comparable analysis can be across companies from the same sector or similar sectors. For instance, the financial statements of auto manufacturers often align around sales, Cost of Goods, and Cash Flow as similar companies in cyclical industries follow comparable paths in profitability, margins, inventory and sales. Further related industries also experience changes which could be leading indicators. Tire companies often reflect the forecast perceptions of sales across the auto value chain. Cross correlational analysis with other macroeconomic indicators may also be part of the overlay information for instance, durable goods orders. When the material information includes international sales, these become more pertinent.

Further, additional information could include stock market information relating to the particular security—such as for example but not limited to price, bid-ask prices and volume, ratios, comparable, options etc.

Referring to the FIG. 9, is an example CashFlow statement for Amazon from 10-Q (for Q3 2020) overlayed with Free Cash Flow slide from the Conference call, showing the change in the Free Cash Flow. While the analyst or stock buyer is viewing the cash flow statement the analyst also hears the relevant CFO's comments from the audio in the earnings call. Cross cutting concerns involving time series sensitive overlay information are designed to provide context-oriented content by the relevant intelligent overlays. Financial Statement Analysis can involve time-series of statement of cash flows as a cross cutting concern implemented as an aspect. Further the stock picker or decision maker may want to collaborate with an expert analyst on the stock or a stock broker. The "Click to Discuss" helps the stock picker to decide and place a call to buy or sell which could be both a live human or an intelligent agent or both. "Collaboration across time" can also occur between the buyer and an analyst or stock broker.

Inversion of overlay and eBook is also possible. This interaction could occur while the buyer is listening to the conference call and then seeks to understand the cash flow statement. Or the buyer could be researching the security for an eventual purchase. At a particular point in time the buyer or analyst could reach the discussion by say a chief finance officer (CFO) on the conference call relating to Cash Flow Statement. At this point the corresponding consolidated statement of the cash flows could be pulled up by the electronic device (100) along with the relevant set of intelligent overlays.

In another embodiment, the overlays can be provided in the context of XBRL. XBRL is an eXtensible Business Reporting Language that can be used to develop business reporting documents. The SEC has made the specification which is extensible and an implementation of the iXBRL openly available for enhancement. XBRL facilitates the creation of Overlays in Financial Documents automatically. The VTOs are separately stored but related to a particular document. One form of the VTOs could relate to particular tags in the XBRL and thus generic. Another could be specific to the XBRLs as well as a particular company or a group of companies. This will allow the VTOs to be easily implemented and enhancements around the VTOs to produce the mechanisms for temporal and sectorial correlation. In the portfolios they could go even further beyond and help facilitate metadata discovery and statistical calculations. (for example the Risk appropriateness of a particular security in the context of a portfolio).

In another embodiment, the Amazon consolidated statement of the Cash Flows above is presented as XBRL. The XBRL tags for the Consolidated Cash Flow Statement Q3 report could be used to produce particular overlays that contain links to the conference call as well as the slides associated with it. The additions create enhanced business reports that are rapidly digesting and contain meta information beyond the current document.

Figure 10:
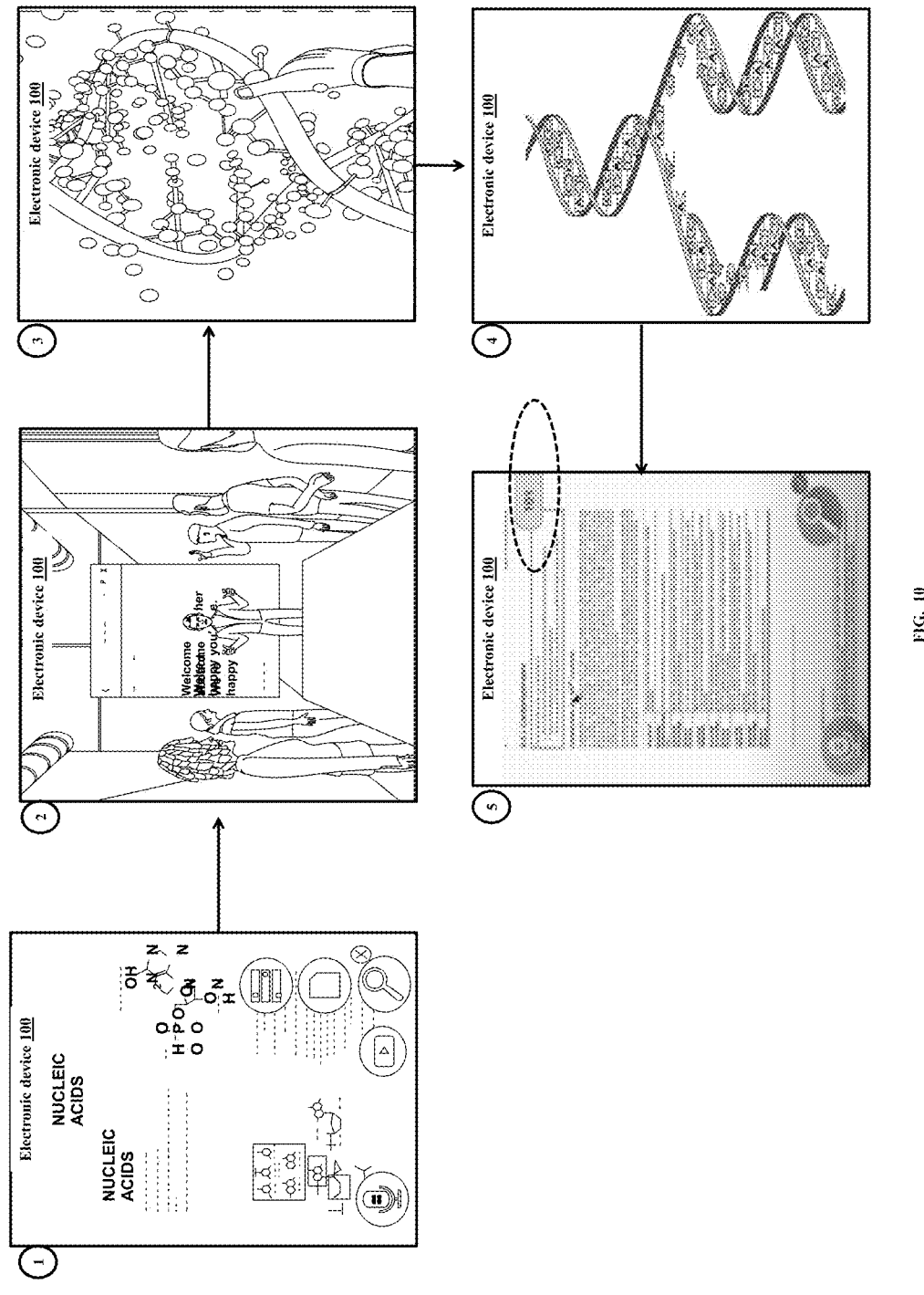
FIG. 10 illustrates an example of providing information associated with the content in the electronic device using metaverse, according to the embodiments as disclosed herein.

FIG. 10 illustrates an example of providing information associated with the content in the electronic device (100) using the metaverse, according to the embodiments as disclosed herein.

In case of collaborative learning the tutor is a major player in the creation and customization of the overlays in the eBook displayed on the electronic device (100). The tutors often provide many services which could be linked to the eBooks in the electronic device (100). When the tutor chooses to customize the full eBook to personalize for the students the tutor can provide the CVTOs as a way to deliver both teaching in the form of lecture videos, content including slides and user interactions.

The personalization of the CVTOs for the students by the tutor is provided as: Each tutor prepares a set of videos which include existing public or private videos and then integrates the set of videos with the textbook of reference along with slides and quizzes and other content. The tutor can also be incremental in content addition. The tutor can also add more questions and assessment, remove, modify or expand the questions. Further, the tutor could be offering a course through a traditional learning management system (LMS) and then integrate that with a personalized eBook application. The two previously disparate systems are now integrated with the following types of linkages:

a) Using the knowledge graph—both the data in the LMS and the eBook are connected via contexts that deal with the knowledge graph. The knowledge graph provides the critical semantic connection and dictionary linkage between the two disparate systems.

b) Using the tutor mandated linkages—the tutor manages both the student's education as well as the content that is part of both the systems.

c) Using the syllabus—when there are multiple syllabuses and the eBook teaches material that is slightly different from the syllabus, there can be discrepancies in linking. However, syllabus based linking can be performed.

d) Sometimes the syllabus may have prerequisite material that the tutor may teach, that align with the knowledge graph but not with the syllabus and exist in the textbook as it is preliminary material that is a requirement to understand the material of the syllabus. Further it is possible that the tutor teaches more than what is in either the book or the syllabus. These differences and discrepancies imply that the method chosen to link the two disparate systems can vary.

Further, the teachers may also be interacting with the student in the context of the eBooks. Both the videos and the lectures sequence will be personalized to suit either the student or the teacher our both. A student is assigned a teacher and/or a tutor when he or she learns a subject. This teacher can then direct the various channels of assignment, assessment, video and social media to suit and customize the needs of the particular student which further personalizes the material associated with a particular student. The use of social media in learning allows the students to interact in groups which also introduce a particular student to the material read or accessed by another student. The personalization can be both peer based personalization as well as teacher/tutor personalization.

When the tutor personalizes the student's learning around content, the tutor generates specific sets of information to go with the textbook and build learning opportunities for the student. The content can then be used by the student to gain significant learning. Further, the proposed method allows usage of the eBook itself as a location where the student and the teacher meet and discover each other is facilitated by CVTO which can be extended to include a "learning metaverse". The student and teacher who meet in a learning Metaverse can then engage each other in a journey of discovery with others. The MetaVerse can be an enhanced form of a Virtual Classroom with a knowledge context of a chapter or sub-chapter in the eBook being the basis of the Metaverse. For example, a Periodic Table could represent a Metaverse and the teacher and student could go about discovering the periodic table together.

Generally, the metaverse has emerged as a parallel universe and can be used as a medium for experiential learning and journeys. Referring to the FIG. 10, at step 1 consider that the user of the eBook is reading through the document for example on the topic "nucleic acid" and has a query. At step 1, the user provides the query with respect to the nucleic acid to the electronic device (100). The electronic device (100) determines the context of the query as say for example "biomolecules" and the meta information associated with the context of the query is fetched. Further, the electronic device (100) determines a match between the meta information associated with "biomolecules" and a Metaverse which deals with "biomolecules". The meta information can be for example, Class level, study keywords etc. On finding the match, the electronic device (100) links the meta information associated with "biomolecules" with the matching data in the Metaverse which deals with "biomolecules" and provides the content in the electronic document with access to the Metaverse which deals with "biomolecules".

At step 2, consider that the user selects to enter the Metaverse which deals with "biomolecules" at a portion of the eBook where the topic "nucleic acid" is introduced. On entering the Metaverse the user can interact with other users who have also entered the same Metaverse and are also exploring similar topics. The user can converse, ask the queries related to nucleic acid directly to other users or tutors, watch 3D movies related to the "nucleic acid", traverse through the entire journey of the Metaverse (as shown in the steps 3 and 4). It should be noted that the electronic device (100) continuously tracks the user's journey through the Metaverse and compares the content of the eBook. When the user wishes to exit the Metaverse after having the information that the user had queried for, the electronic device (100) intelligently determines the page of the eBook where the user should next read based on the journey of the user in the Metaverse. As indicated in the FIG. 10, the electronic device (100) skipped pages between page numbers 1 to 100 in the eBook and directly landed the user on page number 101 after the user traversed the Metaverse journey. As a result the user does not have to re-read all the concepts which were learnt about during the journey through the Metaverse. Here, the electronic device (100) intelligently determines the topics that the user has already learnt and has sufficient level of understanding about. As a result the user can access more information related to the topic and enhance ones knowledge on the topic.

Further, the electronic device (100) automatically determines and tags the Metaverse journey of a prior visitor to the metaverse for the context in the eBook. These tagging and linking methods offer a portal through which one exits into the metaverse. The portals can be created by any user say for example, a fellow student a teacher or a sponsor of the Metaverse. Therefore, a process for discovery and social exploration of learning Metaverses is created by including in-context social content. Further groups of student learners can also team together to create the metaVerses for other students to then explore. This creates of community of creators and developers who allow others to gain from the Metaverses as they explore the eBooks.

Further, the proposed method provides a choice to the user to choose to learn from both the eBook as well as the Metaverse that are related to the particular eBook. The journey involves entry and exit from the eBook application into the Metaverse and either a return back to the same or a different location in the eBook. The journey inside the Metaverse can also be an involved one and the student can be involved in learning as well as a quiz (or an experiential travel or a game) in the Metaverse.

The student need not necessarily return to the same point in the same book. The student could be pushed into a journey that then exits into a different part of the eBook or a different chapter of the eBook or a different volume of the eBook. The overlays are a new form of context oriented content that facilitate inclusion of the Metaverse into a new generation of the eBooks Technology that facilitates the new forms of media as well as interactive content. In addition, material from the eBook could be available to the student while the student journeys into the MetaVerse enabling the student to switch between the eBook and the Metaverse.

In an embodiment, consider the electronic device (100) can include for example a tablet including an avatar of the student which maintains the context of the user learning. The student can turn to the tablet while they journey the Metaverse. This tablet would be a "Virtual Tablet" as it would be in the shape of a tablet device or a special display (either the same a real tablet the student owns) or shaped and branded according to the students wish or preference. One embodiment would implement the virtual Tablet" as a remote display of the real tablet, allowing the student to continue to peruse the tablet as the student navigates the Metaverse. The student's actions on the tablet would lead to a state of the tablet being changed. Another embodiment would allow the remote display to have a replicated state that is not seen in the real screen of the eBook Reader. Therefore, the students in the Metaverse will be able to collaborate with other students and teachers who also visit the same Metaverse as well as students who are in the real verse. This would further draw other students who live outside the Metaverse into the Metaverse. The Metaverse could (or not) allow the student to take photo images of objects in the Metaverse and pass them back to students in the real world. This will entice those students to also enter the Metaverse at points where the first student exists either now or later in time. The "shared Experiences" is facilitated as part of the collaborative learning experience. Further, the student can pass geotags to fellow students as part of collaborative learning which allows students to specify meeting points in the metaverse to enhance the Collaborative Learning experiences. For instance, the location could be a point where many different students attempt problems from a given topic and recordings of these attempts are maintained. This allows new students to learn from the shared experiences of the earlier entrants into the location in the Metaverse.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the claims as described herein.

What is claimed is:

1. A method for providing information associated with a static content in an electronic device, wherein the method comprising:

displaying on a screen of the electronic device an electronic document comprising the static content;

receiving, by the electronic device, a query with respect to the static content displayed on the electronic device from a user of the electronic device, wherein the query comprises context of the static content displayed on the electronic device, similar queries related to the static content raised by at least one another electronic device, and at least one of tags related to the static content displayed on the electronic device, and at least one of a number of users asking the similar queries related to the static content, wherein the context of the static content comprises at least one of a page of the static content in the electronic document, and a line in the page of the static content the electronic;

generating, by the electronic device, a knowledge graph based on the context of the static content displayed on the electronic device, the similar queries raised by the at least one another electronic device, and at least one of the tags related to the static content displayed on the electronic device, and the number of users asking the similar queries related to the static content, wherein the knowledge graph comprises:

a) a first set of information associated with the query, wherein first set of information comprises responses received from a plurality of information sources based on the context of the static content displayed on the electronic device, b) a second set of information associated with the query, wherein the second set of information comprises responses received from the at least one another electronic device which is online based on the query, and c) a third set of information associated with the query, wherein the third set of information comprises responses received to the similar query raised by the at least one another electronic device;

embedding, by the electronic device, the knowledge graph with the received query and a collaborative virtual transparent overlay (CVTO) at a specific location of the static content in the electronic document;

displaying, by the electronic device, the knowledge graph as response to the received query as the CVTO on the screen of the electronic device based on user preference;

obtaining, by the electronic device, a new set of information associated with a new context, wherein the new context is linked to the context of the query; and displaying, by the electronic device, an evolving and updated CVTO of the knowledge graph comprising the new set of information based on the user preference.

2. The method as claimed in claim 1, wherein generating, by the electronic device, the knowledge graph comprising the determined information comprises:

obtaining, by the electronic device, the first set of information comprising responses received from the plurality of sources based on the context of the static content displayed on the electronic device;

sending, by the electronic device, the received query to the at least one another electronic device which is online;

obtaining, by the electronic device, the second set of information associated with the query based on the responses received from the at least one another electronic device which is online;

obtaining, by the electronic device, the third set of information associated with the query based on the responses received to similar query raised by the at least one another electronic device; and generating, by the electronic device, the knowledge graph comprising a plurality of sub-graphs each of which having a plurality of nodes and the first set of information, the second set of information and the third set of information linked to at least one node of the plurality of nodes, wherein the at least one node is a common point at which the first set of information, the second set of information and the third set of information linked to generate the knowledge graph.

3. The method as claimed in claim 2, wherein the at least one node of a plurality of nodes of the knowledge graph for linking each of the first set of information, the second set of information and the third set of information is manually provided to the electronic device.

4. The method as claimed in claim 2, wherein displaying, by the electronic device, the knowledge graph to the received query as the CVTO comprises:

determining, by the electronic device, a hierarchy for arrangement based on at least one of the user preference of information hierarchy, a source of the information, a mode of presentation of the information, a rating of the source of the information associated with the knowledge graph;

arranging, by the electronic device, the plurality of nodes of the knowledge graph based on the hierarchy for arrangement; and displaying, by the electronic device, the knowledge graph to the received query as the CVTO.

5. The method as claimed in claim 1, further comprising:

updating, by the electronic device, the CVTO of the knowledge graph based on iterative improvement of the knowledge graph.

6. The method as claimed in claim 1, further comprising:

storing, by the electronic device, a table comprising the plurality of queries and the CVTO of the knowledge graph associated with the context, wherein the plurality of queries are added into a distributed Queue against a topic based on the context;

receiving, by the electronic device, a similar query provided by a user; and providing, by the electronic device, the determined at least one the CVTO of the knowledge graph associated with the context of the similar query from the stored table.

7. The method as claimed in claim 1, wherein the CVTO of the knowledge graph comprises multiple layers of information and is structured to expand based on user selection.

8. The method as claimed in claim 7, wherein each of the multiple layers of information is associated with a specific source of information.

9. The method as claimed in claim 7, wherein the CVTO of the knowledge graph is implemented in one of an augmented reality (AR) environment with the multiple layers of information augmented to the knowledge graph and a virtual reality (VR) environment.

10. The method as claimed in claim 1, further comprising:

providing, by the electronic device, a plurality of questions to the user based on access of the CVTO of the knowledge graph by the user periodically and a level of understanding of the user based on response to the plurality of questions;

modifying, by the electronic device, the information in the knowledge graph based on evolving tree, wherein the evolving tree comprises the levels of understanding associated with a number of correct response to the plurality of questions; and updating, by the electronic device, the CVTO of the knowledge graph based on the modification of the knowledge graph.

11. The method as claimed in claim 10, further comprising:

providing, by the electronic device, an inquiry widget to determine an interest of the user in posing the query;

receiving, by the electronic device, a user response to the inquiry widget; and updating, by the electronic device, the CVTO of the knowledge graph based on the user response to the inquiry widget.

12. The method as claimed in claim 1, wherein the evolving and updated CVTO comprising the new set of information based on one of the user preference, and an evolving tree.

13. The method as claimed in claim 1, wherein the electronic document is displayed remotely by a server and the CVTO is provided locally on the electronic device.

14. The method as claimed in claim 1, wherein the knowledge graph and the CVTO is continuously updated based on reinforcement learning.

15. The method as claimed in claim 1, further comprising:

sharing, by the electronic device, a level of understanding of the user with another electronic device;

receiving, by the electronic device, additional data from the another electronic device to enhance the level of understanding of the user, wherein the another electronic device is a tutor device;

updating, by the electronic device, the information in the knowledge graph based on the received additional data; and updating, by the electronic device, the CVTO of the knowledge graph based on modification of the knowledge graph.

16. A method for providing information associated with a static content in an electronic device, wherein the method comprising:

displaying on a screen of the electronic device an electronic document comprising the static content;

receiving, by the electronic device, a query with respect to the static content from a user of the electronic device displayed on the electronic device;

determining, by the electronic device, a match between meta information associated with context of the query and at least one data in a metaverse to obtain at least one matched data in the metaverse, wherein the meta information associated with the context of the query identifies details of the user who raised the query, a date of raising the query, and a date of modification of the query;

determining, by the electronic device, a tag associated with a journey of at least one another user traversing through the metaverse based on the context of the query and context of the static content of the electronic document;

tagging, by the electronic device, the meta information associated with the context of the query with the at least one matched data in the metaverse based on the tag associated with at least one another user traversing through the metaverse;

providing, by the electronic device, the static content in the electronic document with access to the at least one matched data tagged with the meta information associated with the context of the query in the metaverse;

detecting, by the electronic device, an input from the user of the electronic device to enter into the metaverse at a point of availability of the at least one matched data tagged with the meta information associated with the context of the query;

accessing, by the electronic device, the at least one matched data tagged with the meta information associated with the context of the query in the metaverse by interacting with other users who have also entered the metaverse and exploring the same static content; and exiting, by the electronic device, the metaverse at another point of the metaverse after accessing the at least one matched data.

17. The method as claimed in claim 16, wherein the metaverse is created, updated and modified by a plurality of users of a plurality of the electronic devices in a collaborative learning environment.

18. The method as claimed in claim 17, wherein accessing other data associated with the context of the static content comprises interacting with the users of the plurality of electronic devices in a collaborative learning environment.

19. The method as claimed in claim 16, wherein the tag associated with the journey of the at least one an other user is automatically generated based on learning and manually tagged by at least one another user of a plurality of users.

20. An electronic device for providing information associated with a static content, wherein the electronic device comprises:

a memory;

a processor coupled to the memory;

a communicator coupled to the memory and the processor;

a content management controller coupled to the memory, the processor and the communicator, and wherein the content management controller is configured to:

display on a screen of the electronic device an electronic document comprising the static content;

receive a query with respect to the static content displayed on the electronic device from a user of the electronic device, wherein the query comprises context of the static content displayed on the electronic device, similar queries related to the static content raised by at least one another electronic device, and at least one of tags related to the static content displayed on the electronic device, and at least one of a number of users asking the similar queries related to the static content, wherein the context of the static content comprises at least one of a page of the static content in the electronic document, and a line in the page of the static content the electronic;

generate a knowledge graph based on the context of the static content displayed on the electronic device, the similar queries raised by the at least one another electronic device, and at least one of the tags related to the static content displayed on the electronic device, and the number of users asking the similar queries related to the static content, wherein the knowledge graph comprises:

a) a first set of information associated with the query, wherein first set of information comprises responses received from a plurality of information sources based on the context of the static content displayed on the electronic device, b) a second set of information associated with the query, wherein the second set of information comprises responses received from the at least one another electronic device which is online based on the query, and c) a third set of information associated with the query, wherein the third set of information comprises responses received to the similar query raised by the at least one another electronic device;

embed the knowledge graph with the received query and a collaborative virtual transparent overlay (CVTO) at a specific location of the static content in the electronic document;

display the knowledge graph as response to the received query as the CVTO on the screen of the electronic device based on user preference;

obtaining a new set of information associated with a new context, wherein the new context is linked to the context of the query; and display an evolving and updated CVTO of the knowledge graph comprising the new set of information based on the user preference.

21. The electronic device as claimed in claim 20, wherein the content management controller is configured to generate the knowledge graph comprising the determined information comprises:

obtain the first set of information comprising responses received from the plurality of sources based on the context of the static content displayed on the electronic device;

send the received query to the at least one another electronic device which is online;

obtain the second set of information associated with the query based on the responses received from the at least one another electronic device which is online;

obtain the third set of information associated with the query based on the responses received to similar query raised by the at least one another electronic device; and generate the knowledge graph comprising a plurality of sub-graphs each of which having a plurality of nodes and the first set of information, the second set of information and the third set of information linked to at least one node of the plurality of nodes, wherein the at least one node is a common point at which the first set of information, the second set of information and the third set of information linked to generate the knowledge graph.

22. The electronic device as claimed in claim 21, wherein the at least one node of a plurality of nodes of the knowledge graph for linking each of the first set of information, the second set of information and the third set of information is manually provided to the electronic device.

23. The electronic device as claimed in claim 20, wherein the content management controller is configured to display the knowledge graph to the received query as the CVTO comprises:

determine a hierarchy for arrangement based on at least one of the user preference of information hierarchy, a source of the information, a mode of presentation of the information, a rating of the source of the information associated with the knowledge graph;

arrange the plurality of nodes of the knowledge graph based on the hierarchy for arrangement; and display the knowledge graph to the received query as the CVTO.

24. The electronic device as claimed in claim 20, wherein the content management controller is further configured to:

update the CVTO of the knowledge graph based on iterative improvement of the knowledge graph.

25. The electronic device as claimed in claim 20, wherein the content management controller is further configured to:

store a table comprising the plurality of queries and the CVTO of the knowledge graph associated with the context, wherein the plurality of queries are added into a distributed Queue against a topic based on the context;

receive a similar query provided by a user; and provide the determined at least one the CVTO of the knowledge graph associated with the context of the similar query from the stored table.

26. The electronic device as claimed in claim 20, wherein the CVTO of the knowledge graph comprises multiple layers of information and is structured to expand based on user selection.

27. The electronic device as claimed in claim 26, wherein each of the multiple layers of information is associated with a specific source of information.

28. The electronic device as claimed in claim 26, wherein the CVTO of the knowledge graph is implemented in one of an augmented reality (AR) environment with the multiple layers of information augmented to the knowledge graph and a virtual reality (VR) environment.

29. The electronic device as claimed in claim 20, wherein the content management controller is further configured to:

provide a plurality of questions to the user based on access of the CVTO of the knowledge graph by the user periodically and a level of understanding of the user based on response to the plurality of questions;

modify the information in the knowledge graph based on evolving tree, wherein the evolving tree comprises the levels of understanding associated with a number of correct response to the plurality of questions; and update the CVTO of the knowledge graph based on modification of the knowledge graph.

30. The electronic device as claimed in claim 29 wherein the content management controller is further configured to:

provide an inquiry widget to determine an interest of the user in posing the query;

receive a user response to the inquiry widget; and update the CVTO of the knowledge graph based on the user response to the inquiry widget.

31. The electronic device as claimed in claim 20, wherein the evolving and updated CVTO comprising the new set of information based on one of the user preference, and an evolving tree.

32. The electronic device as claimed in claim 20, wherein the electronic document is displayed remotely by a server and the CVTO is provided locally on the electronic device.

33. The electronic device as claimed in claim 20, wherein the knowledge graph comprises a plurality of sub-graphs comprising additional information associated with the context of the query and is displayed based on one of the user preference and an evolving tree.

34. The electronic device as claimed in claim 20, wherein the knowledge graph and the generated CVTO is continuously updated based on reinforcement learning.

35. The electronic device as claimed in claim 20, wherein the content management controller is further configured to:

share a level of understanding of the user with another electronic device;

receive additional data from the another electronic device to enhance the level of understanding of the user, wherein the another electronic device is a tutor device;

update the information in the knowledge graph based on the received additional data; and update the CVTO of the knowledge graph based on modification of the knowledge graph.

36. An electronic device for providing information associated with a static content, wherein the electronic device comprises:

a memory;

a processor coupled to the memory;

a communicator coupled to the memory and the processor;

a content management controller coupled to the memory, the processor and the communicator, and wherein the content management controller is configured to:

display on a screen of the electronic device an electronic document comprising the static content;

receive a query with respect to the static content from a user of the electronic device displayed on the electronic device;

determine a match between meta information associated with context of the query and at least one data in a metaverse to obtain at least one matched data in the metaverse, wherein the meta information associated with the context of the query identifies details of the user who raised the query, a date of raising the query, and a date of modification of the query;

tag the meta information associated with the context of the query with the at least one matched data in the metaverse based on the tag associated with at least one another user traversing through the metaverse;

provide the static content in the electronic document with access to the at least one matched data tagged with the meta information associated with the context of the query in the metaverse;

detect an input from the user of the electronic device to enter into the metaverse at a point of availability of the at least one matched data tagged with the meta information associated with the context of the query;

access the at least one matched data tagged with the meta information associated with the context of the query in the metaverse by interacting with other users who have also entered the metaverse and exploring the same static content; and exit the metaverse at another point of the metaverse after accessing the at least one matched data.

37. The electronic device as claimed in claim 36, wherein the metaverse is created, updated and modified by a plurality of users of a plurality of electronic devices in a collaborative learning environment.

38. The electronic device as claimed in claim 37, wherein accessing other data associated with the context of the static content comprises interacting with the plurality of users of the plurality of electronic devices in the collaborative learning environment.

39. The electronic device as claimed in claim 36, wherein the tag associated with a journey of the at least one another user is one of automatically generated based on learning and manually tagged by at least one another user of a plurality of users.

*    *    *    *    *